May 28, 1963  H. E. CRUMRINE ETAL  3,091,219
XEROGRAPHIC DEVELOPING APPARATUS
Original Filed June 3, 1957  17 Sheets-Sheet 1

INVENTORS
Herbert E. Crumrine
Charles L. Huber
BY
ATTORNEY

INVENTOR.
Herbert E. Crumrine
Charles L. Huber

*INVENTOR.*
Herbert E. Crumrine
Charles L. Huber
BY

ATTORNEY

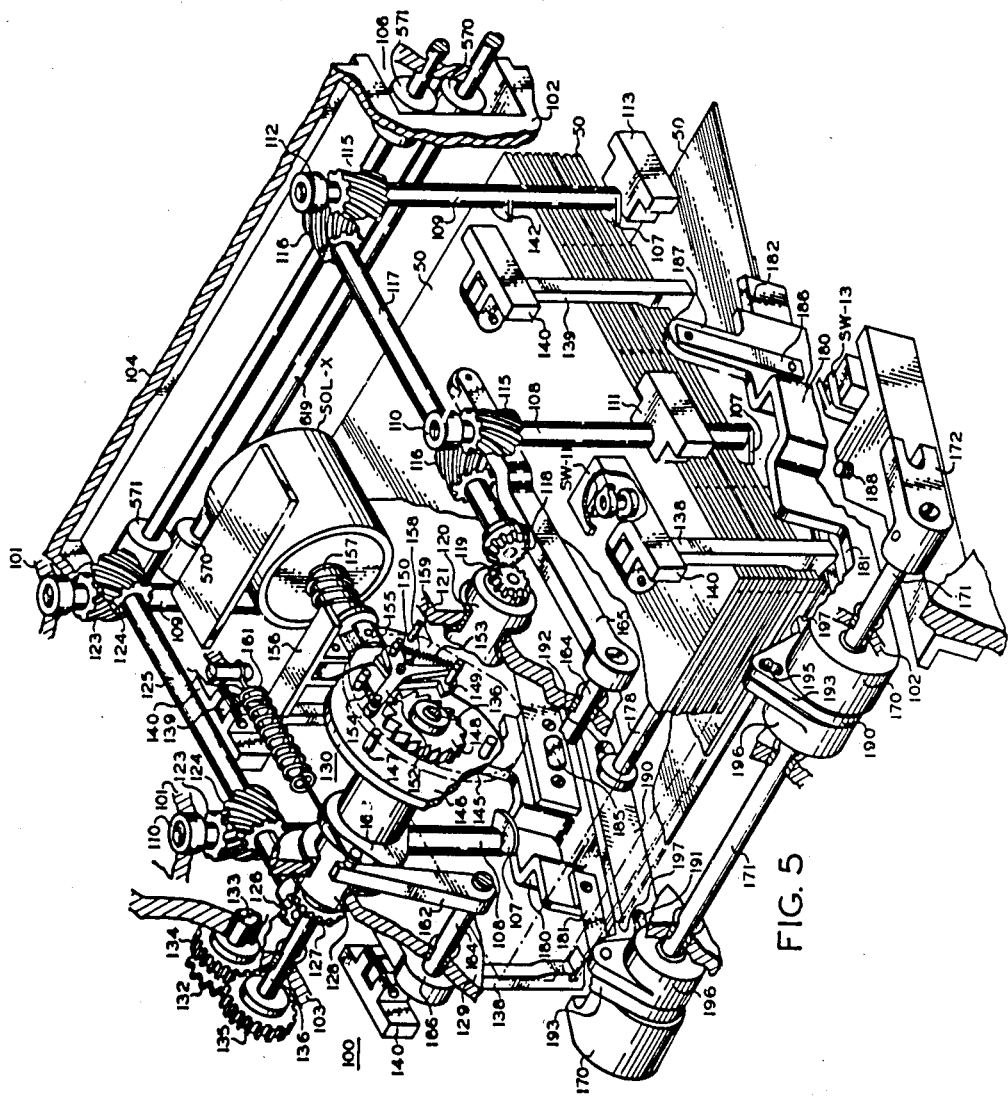

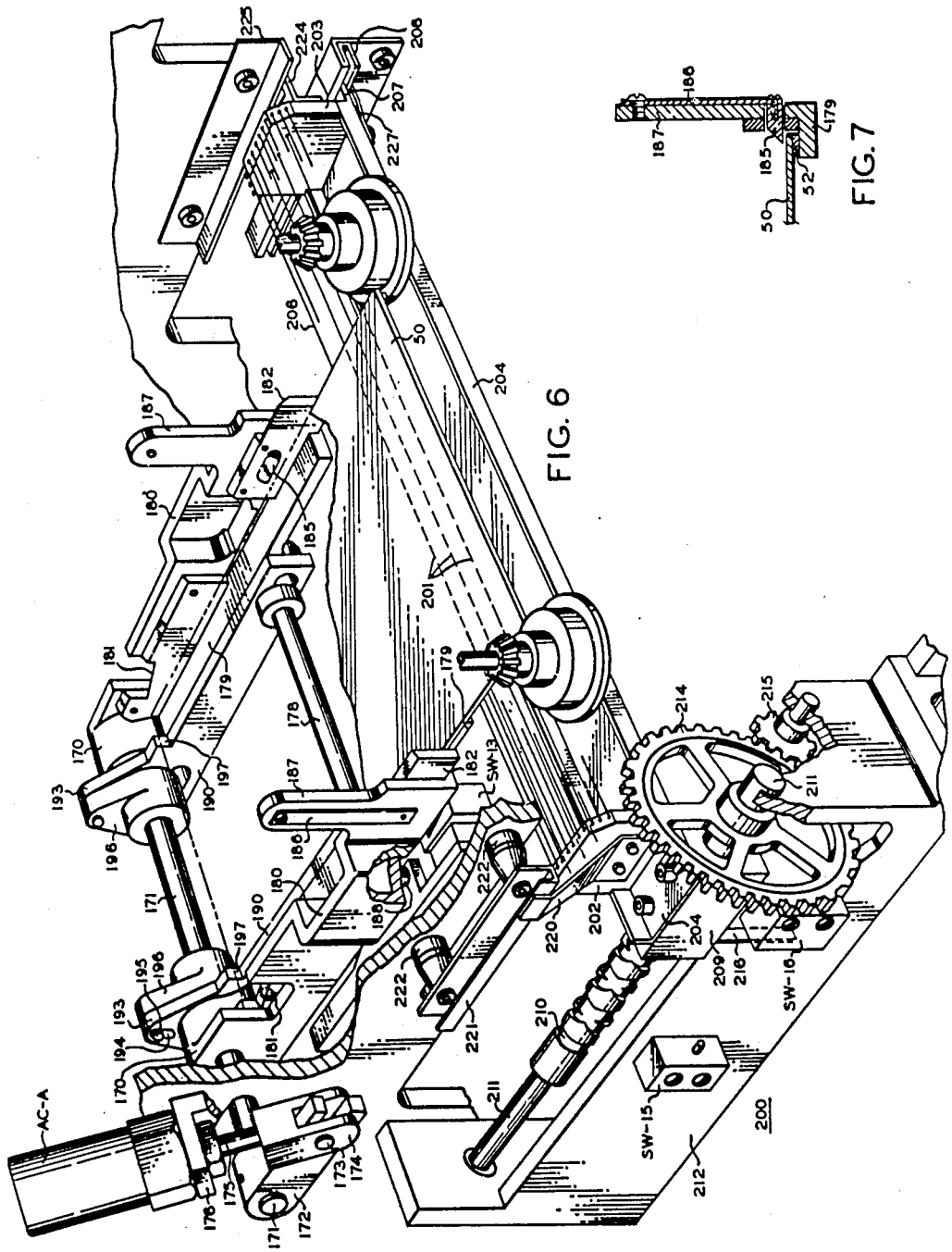

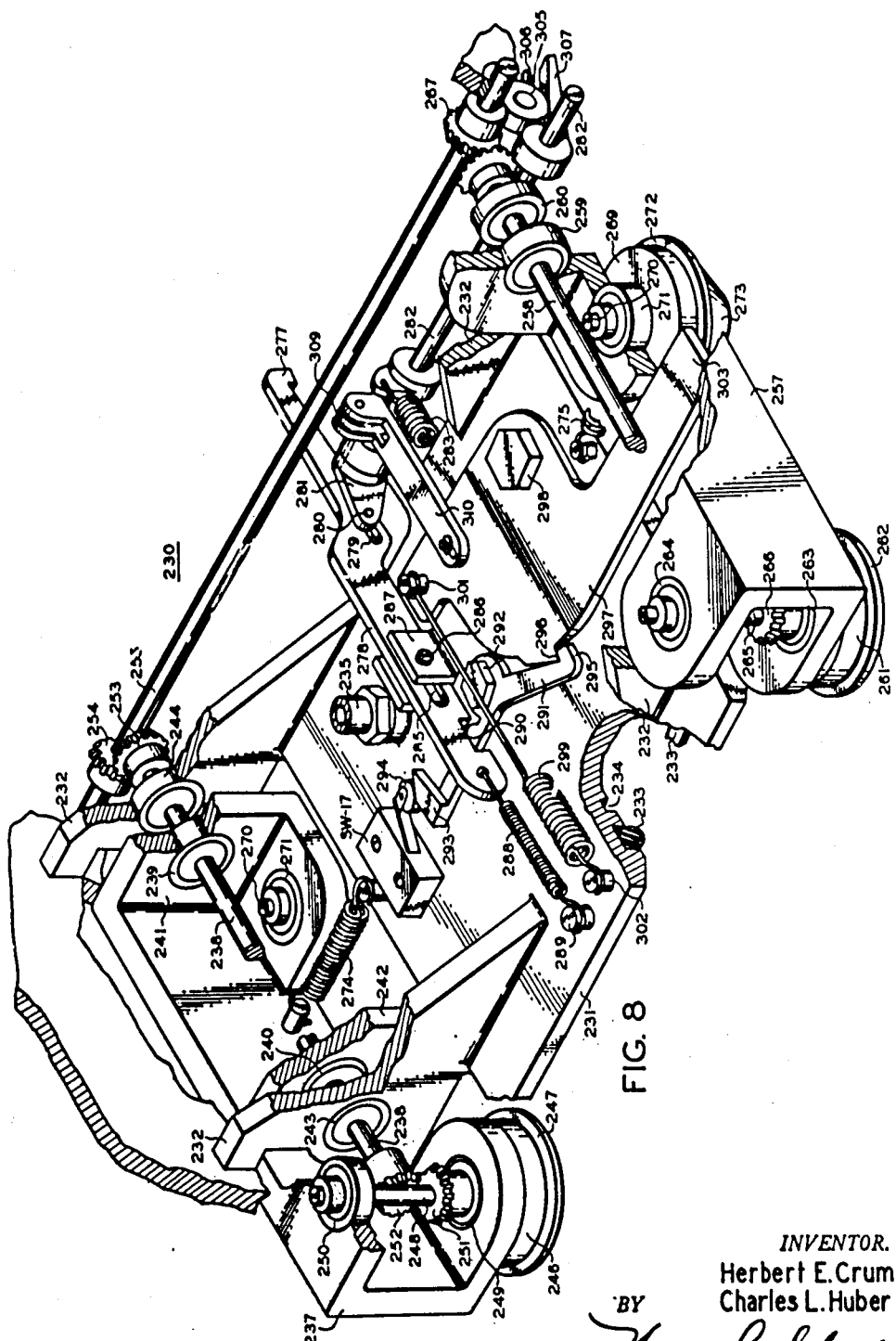

INVENTORS
Herbert E. Crumrine
Charles L. Huber
ATTORNEY

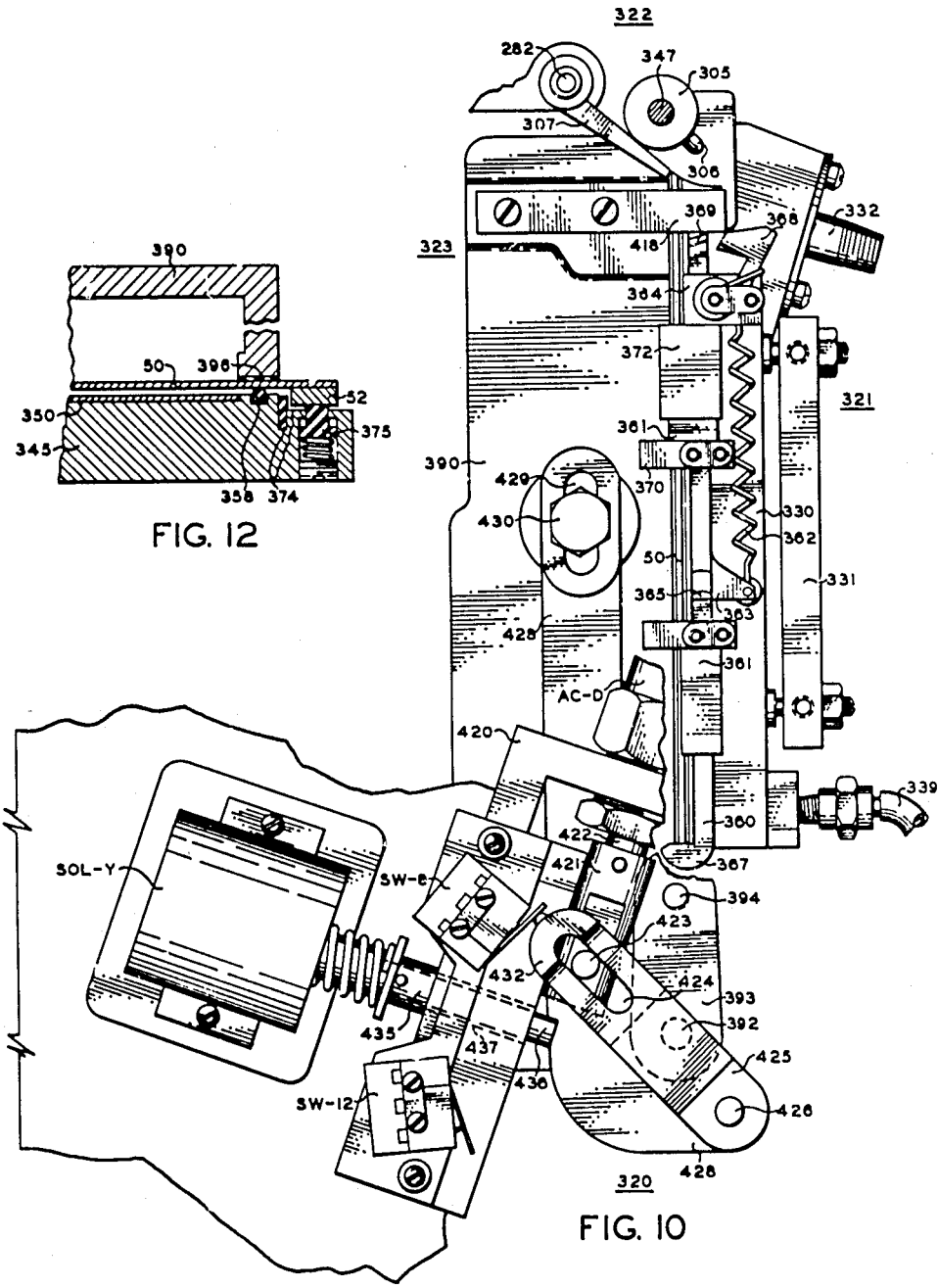

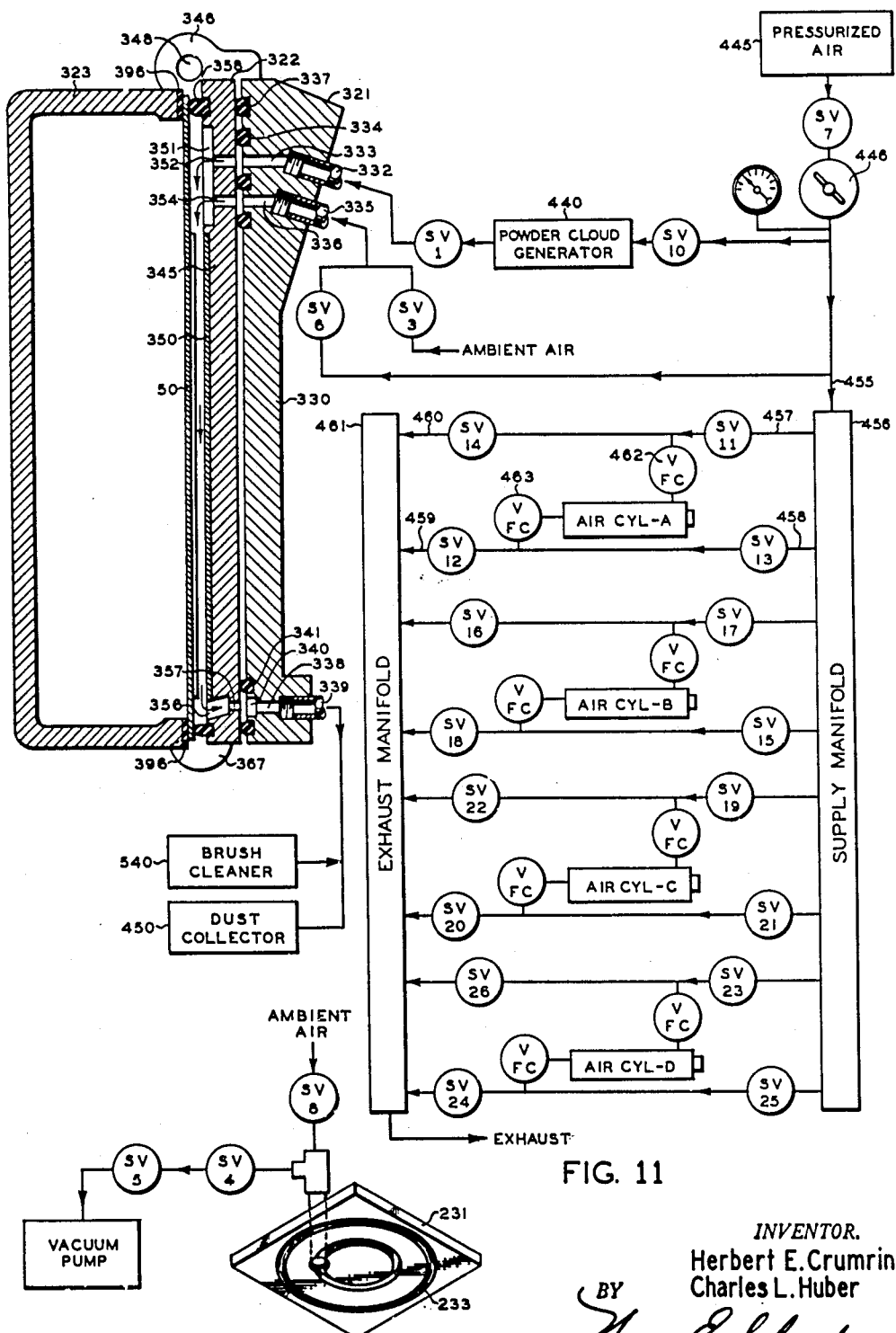

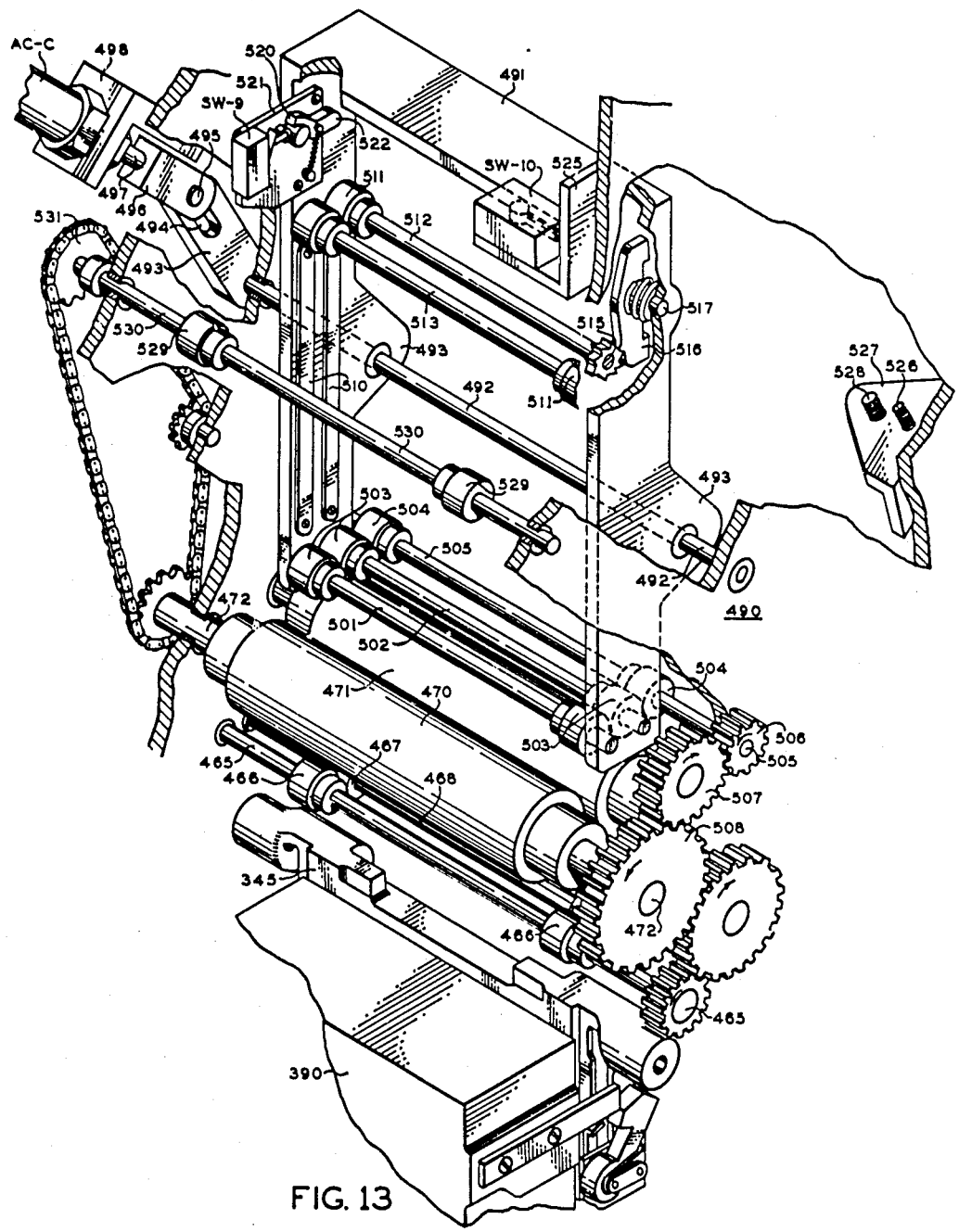

May 28, 1963  H. E. CRUMRINE ETAL  3,091,219
XEROGRAPHIC DEVELOPING APPARATUS
Original Filed June 3, 1957  17 Sheets-Sheet 11

INVENTOR.
Herbert E. Crumrine
Charles L. Huber
BY
ATTORNEY

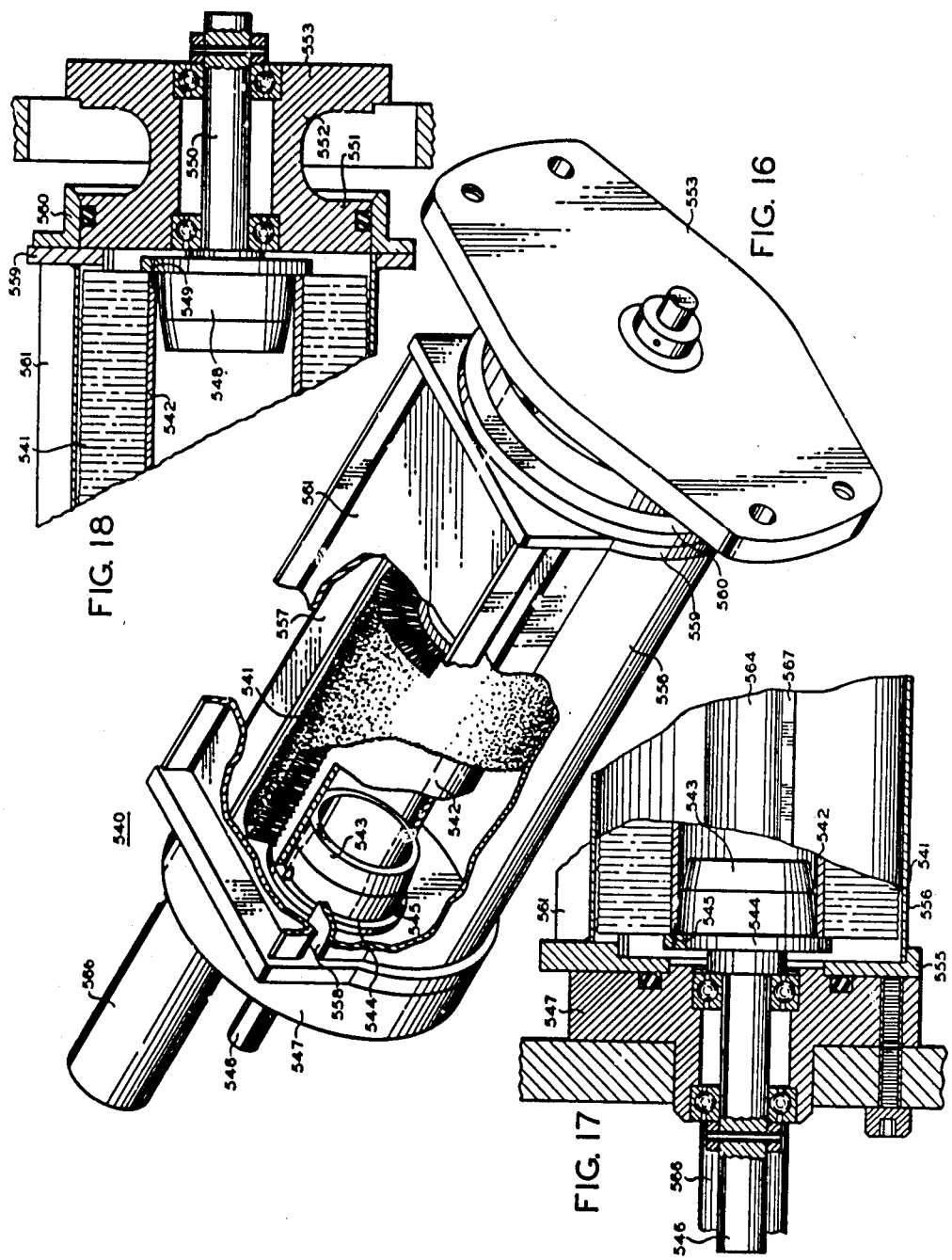

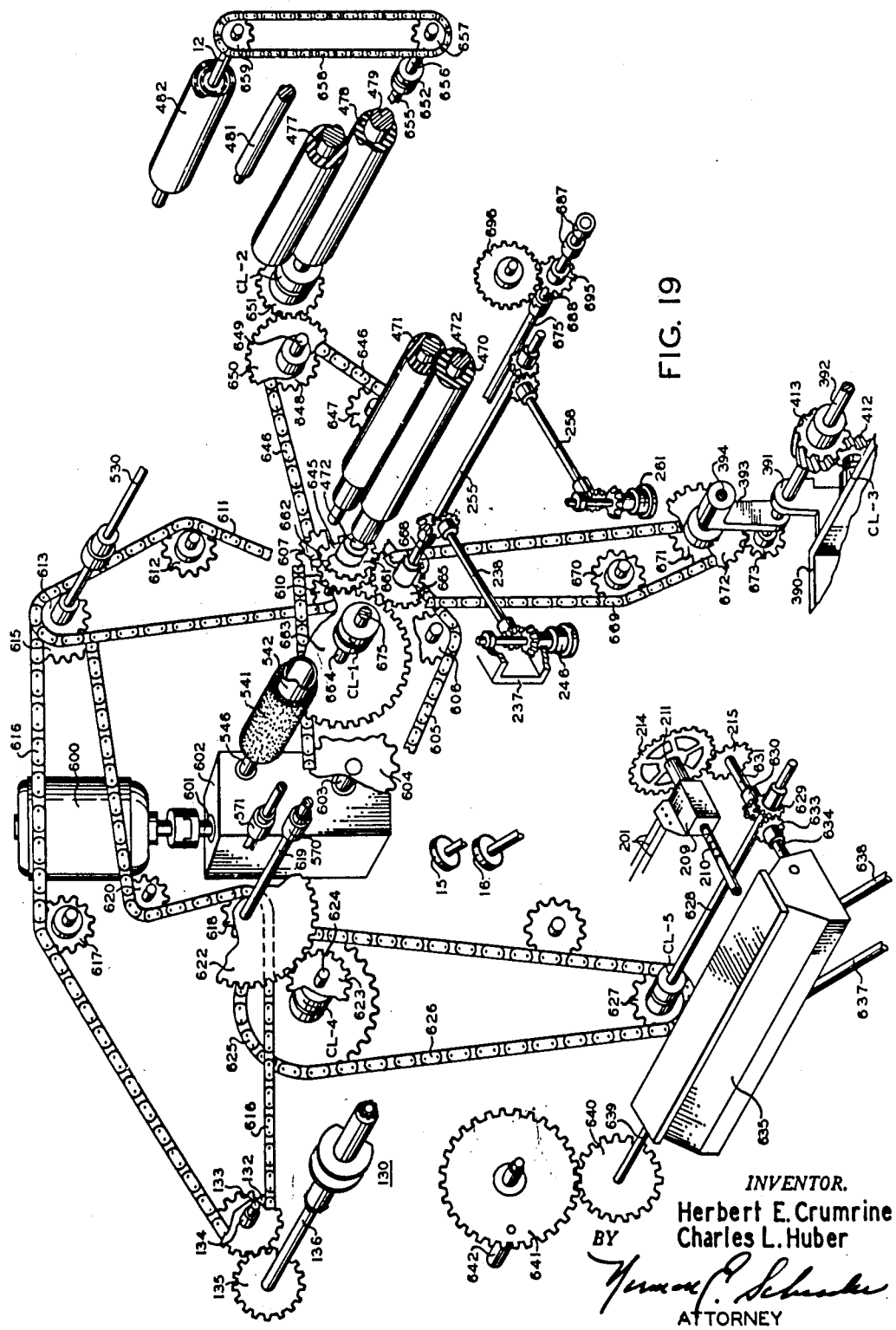

May 28, 1963 H. E. CRUMRINE ETAL 3,091,219
XEROGRAPHIC DEVELOPING APPARATUS
Original Filed June 3, 1957 17 Sheets-Sheet 14

INVENTOR
Herbert E. Crumrine
Charles L. Huber

INVENTOR
Herbert E. Crumrine
Charles L. Huber

*INVENTOR.*
Herbert E. Crumrine
Charles L. Huber
BY
ATTORNEY

3,091,219
XEROGRAPHIC DEVELOPING APPARATUS
Herbert E. Crumrine, Rochester, and Charles L. Huber, Byron, N.Y., assignors to Xerox Corporation, a corporation of New York
Original application June 3, 1957, Ser. No. 663,085. Divided and this application Dec. 24, 1958, Ser. No. 782,774
4 Claims. (Cl. 118—637)

This invention relates to the field of xerography and, particularly, to improvements in automatic xerographic processing equipment for forming direct xerographs.

In the process of xerography, for example, as disclosed in Carlson Patent 2,297,691, issued October 6, 1952, a xerographic plate comprising a layer of photoconductive insulating material on a conductive backing is given a uniform electric charge over its surface and is then exposed to the subject matter to be reproduced, usually by conventional projection techniques. This exposure discharges the plate areas in accordance with the light intensity that reaches them, and thereby creates an electrostatic latent image on or in the photoconductive layer. Development of the latent image is effected with an electrostatically charged, finely divided material, such as an electroscopic powder, which is brought into surface contact with the photoconductive layer and is held thereon electrostatically in a pattern corresponding to the electrostatic latent image. Thereafter, the developed xerographic powder image is usually transferred to a support surface to which it may be fixed by any suitable means.

Following the disclosure of the basic electrophotographic or xerographic techniques in the Carlson patent, many improvements have been made in xerographic plates and developing materials to increase plate sensitivity and panchromaticity and to improve resolution of the final image structure. In addition, many improvements have been made in each of the component devices for effecting xerographic processing, i.e., in devices for electrostatically charging xerographic plates, in devices for exposing such plates, in apparatus for developing electrostatic latent images, in xerographic powder image transfer devices, and in powder image fixing devices. For the most part such improvements have been employed in apparatus for reproducing line copy images, and such devices are presently in wide commercial use for this purpose. However, the additional complexities involved in forming continuous tone images by xerographic techniques has heretofore hindered the application of such techniques to the field of direct photography.

The principal object of this invention is to improve automatic xerographic processing equipment to provide a compact, high speed, and light weight apparatus for forming direct positive, continuous tone xerographs, particularly for use in aircraft. A further object of the invention is to minimize the time delay between the sensitization of a xerographic plate and the development of an electrostatic latent image formed thereon. A further object of the invention is to extend the time period between successive uses of indiviual xerographic plates employed in automatic xerographic processing equipment. A further object of the invention is to maintain a xerographic processing apparatus free of accumulated developing powder during operation. A further object of the invention is to improve xerographic plate handling devices to permit rapid, uniform and positive movement of a rigid xerographic plate through an automatic xerographic processing apparatus. A further object of the invention is to improve xerographic plate storage devices to permit repetitive processing of successive xerographic plates seriatim. A further object of the invention is to improve xerographic developing apparatus whereby the xerographic developing operation may be effected in a sealed chamber and wherein the development electrode surface may be cleaned between developing operations. A further object of the invention is to improve xerographic plate charging devices for forming a uniform electrostatic charge on a xerographic plate surface. A further object of the invention is to improve xerographic plate positioning devices for maintaining a xerographic plate in the focal plane of a lens system. A further object of the invention is to improve xerographic plate cleaning mechanisms for removing residual powder from xerographic plates in transit. A further object of the invention is to improve apparatus for transferring xerographic powder images from xerographic plates to a support surface.

These and other objects of the invention are attained in a preferred embodiment which comprises a self-contained, fully automatic, xerographic system that is intended for use in an aircraft for producing successive, continuous tone, aerial xerographs under the control of an intervalometer. Essentially, the apparatus includes a magazine assembly for storing xerographic plates, a charging assembly for forming a uniform electrostatic charge on the photoconductive surface of each plate, a lens and shutter assembly for making exposures, a development assembly for developing the latent images on the plates, a printing assembly for transferring developed images to a continuous paper strip, brush cleaning devices for removing residual developing powder from the xerographic plates and the development electrode of the developing assembly, and plate handling and control devices associated with these assemblies to form a completely integrated and fully automatic system.

In operation, xerographic plates are fed seriatim from the magazine to an exposure position and, in transit, each plate is charged by a scorotron or screened corona discharge device that places a uniform positive electrostatic charge over the surface of the plate. The plate is then passed to an exposure position wherein it is exposed in conventional manner to form a latent pattern of electrostatic charges thereon that corresponds to the subject of the exposure, and is then transported to a development chamber wherein it is positioned adjacent to a development electrode. Development is effected by a negatively charged developing powder that is injected into the chamber from a powder cloud generator connected thereto, the powder particles being electrostatically attracted to the positive charge pattern formed on the plate. When development is complete, the chamber is scavenged by low pressure air to remove developing powder suspended in the air of the chamber. The chamber is then partly opened, and the plate is advanced to feed rolls that pass it through pressure rolls in conjunction with a continuous, adhesive-coated, paper strip whereby the powder image formed on the plate is transferred to the adhesive strip. Once the plate is clear of the developing chamber, the chamber is reclosed and scavenged with high pressure air to eliminate residual powder, and the development electrode is cleaned by a brush assembly that is actuated through a clutch that forms part of the development chamber assembly. After leaving the pressure transfer rolls, the transfer paper with the powder image thereon is passed through a second set of pressure rolls conjointly with a transparent plastic web which adheres to the adhesive on the transfer strip and fixes the powder image thereon by forming a protective cover thereover.

Simultaneously, the plate is passed to a pivotable direction-changing mechanism having plate driving rolls frictionally driven from a drive roll geared to the transfer pressure rolls. Plate holding rolls retain the plate within the direction-changing mechanism as it is pivoted about its axis to engage the driving rolls with a second drive roll that reverses the direction of rotation of the plate driving rolls. On engagement with the second drive roll, the plate is withdrawn from the direction-changing mechanism and is advanced through a cleaning position wherein residual powder is dusted therefrom by a cleaning brush which, in turn, is cleaned of residual powder by a flicking bar. Suitable vacuum means are provided to remove this residual powder from the machine. After passing through the cleaning position, the plate is gripped by another set of drive rolls and is returned to the magazine wherein it is deposited on top of the other plates therein for reuse.

A preferred form of the invention is disclosed in the appended drawings, in which:

FIG. 5 is an isometric view of the xerographic plate magazine assembly, with side walls broken away, illustrating the several plate actuating mechanisms therein;

FIG. 6 is an isometric view of the plate transfer mechanism and plate charging mechanism;

FIG. 7 is a detail sectional view of the xerographic plate latching mechanism of the plate transfer mechanism;

FIG. 8 is an isometric view, partly in section, of the exposure position mechanism of the invention;

FIG. 10 is a side elevation of the developing mechanism of the invention, showing the several component parts thereof in retracted position for developing a xerographic plate;

FIG. 11 is a schematic diagram of the pneumatic system of the invention, and includes a schematic cross-sectional view of the major components of the developing mechanism, as well as a schematic isometric view of a portion of the exposure position mechanism;

FIG. 12 is a sectional view illustrating the structural arrangement for electrically isolating a xerographic plate held in the developing mechanism assembly;

FIG. 13 is an isometric view of the direction-changing mechanism;

FIG. 16 is an isometric view, partly in section, of the xerographic plate brush cleaner mechanism;

FIGS. 17 and 18 are detailed sectional views, respectively, of the left and right hand structural arrangements for supporting the xerographic plate cleaning brush of FIG. 16;

FIG. 19 is a schematic isometric view, partly in section, of the drive mechanism of the invention;

Figure 25:
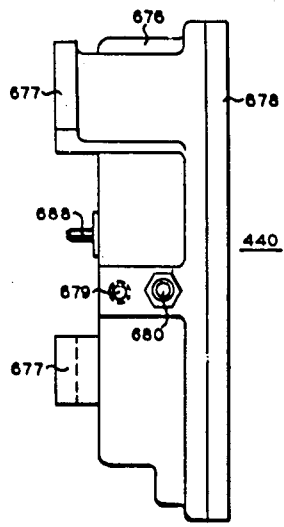
Figure 24:
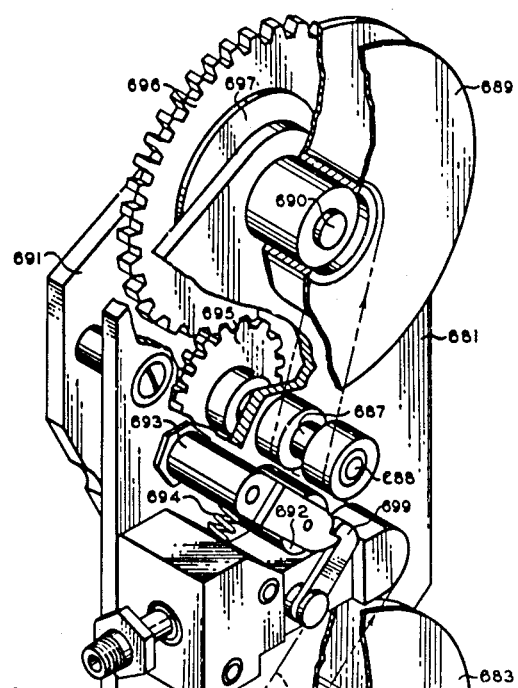
Figure 20:
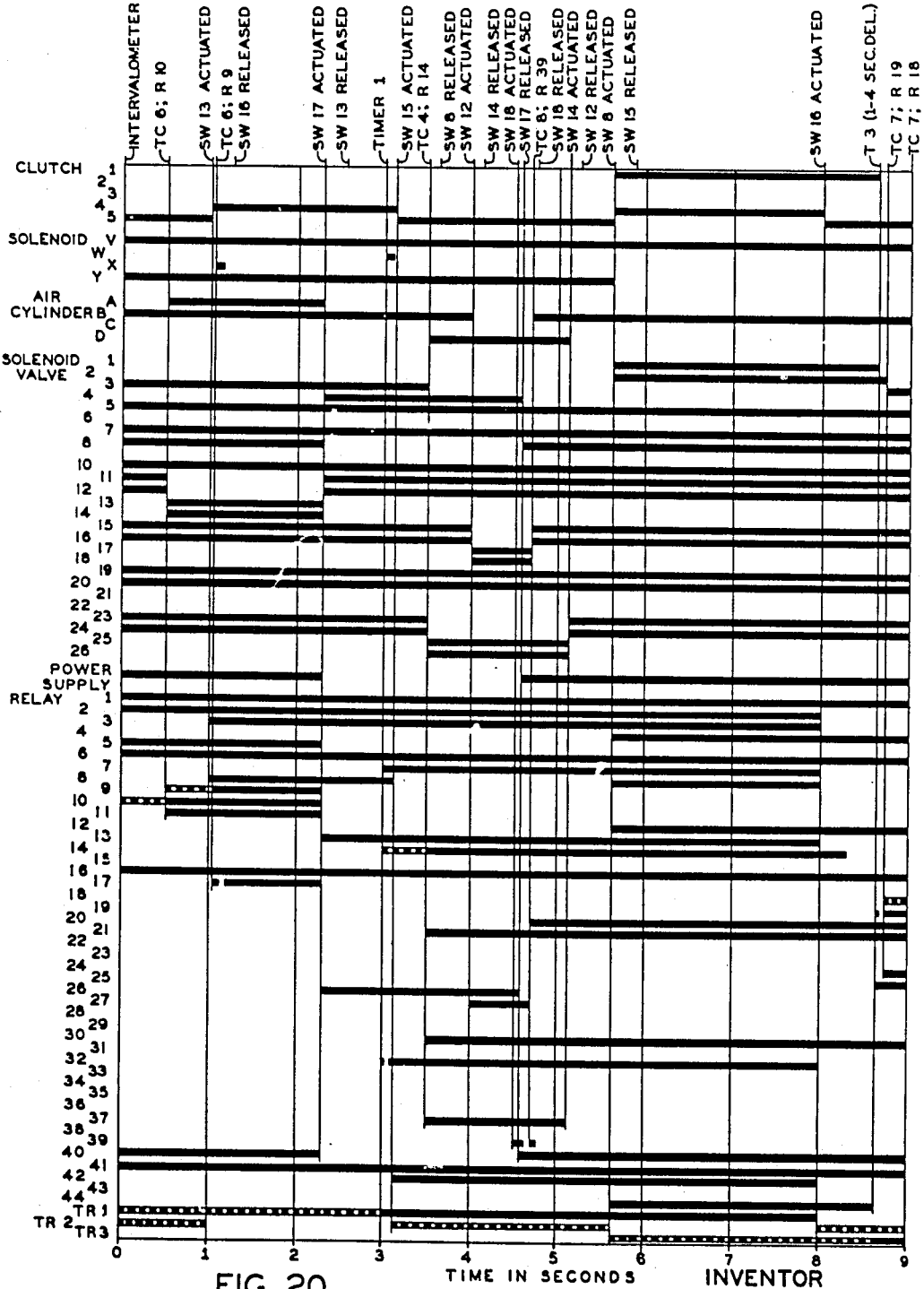
Figure 21:
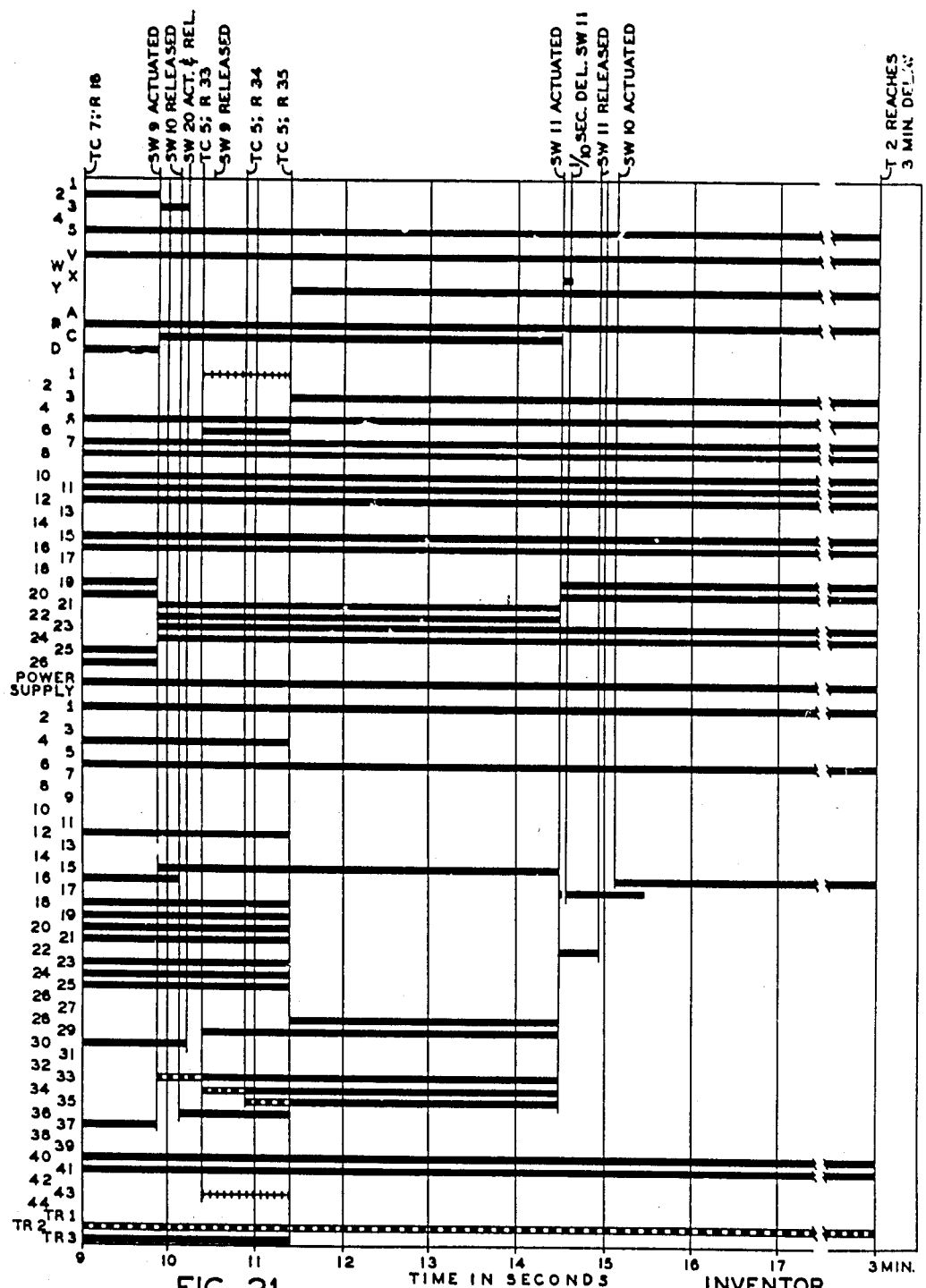
Figure 22:
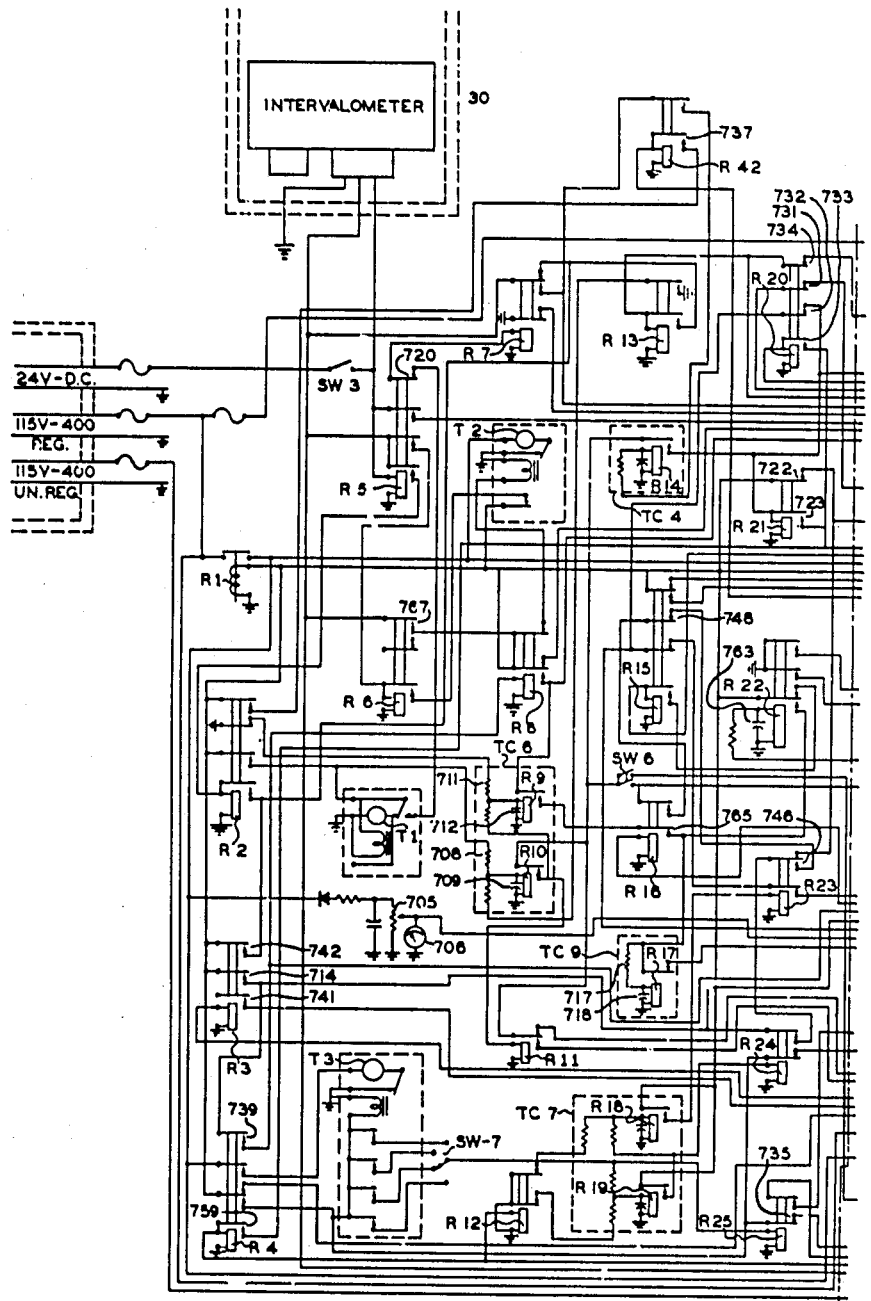
Figure 23:
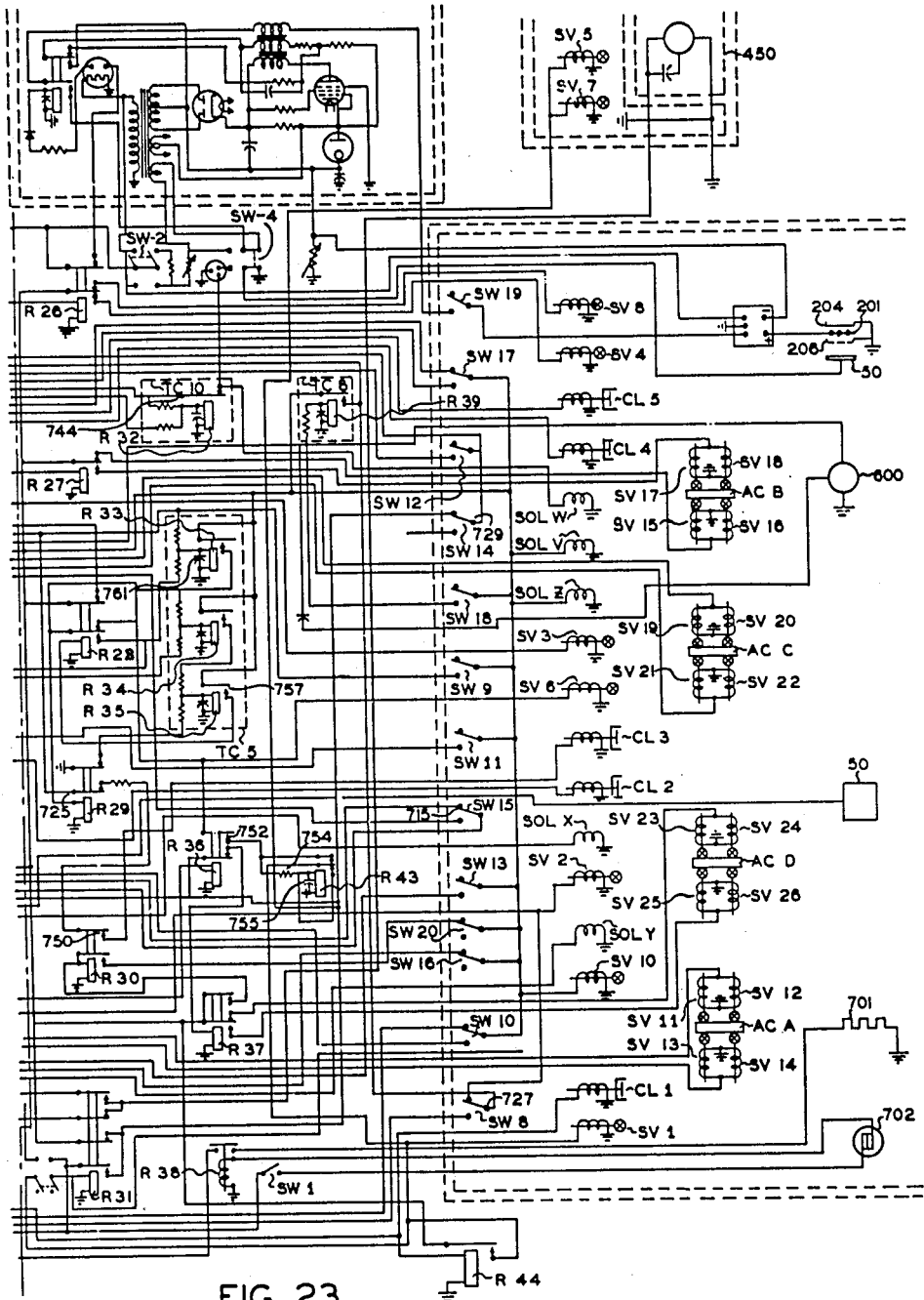

FIGS. 20 and 21, taken together, constitute a timing chart of an operational cycle of the mechanism of the invention;

FIGS. 22 and 23, taken together, constitute a wiring diagram of the several electrical control circuits of the invention;

FIG. 24 is an isometric view of the powder cloud generating mechanism;

FIG. 25 is a side elevation of a powder cloud generating assembly; and

Figure 26:
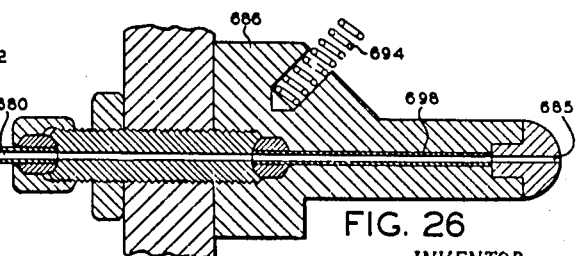

FIG. 26 is a sectional view of the powder outlet assembly of the powder cloud generating assembly.

Figure 1:
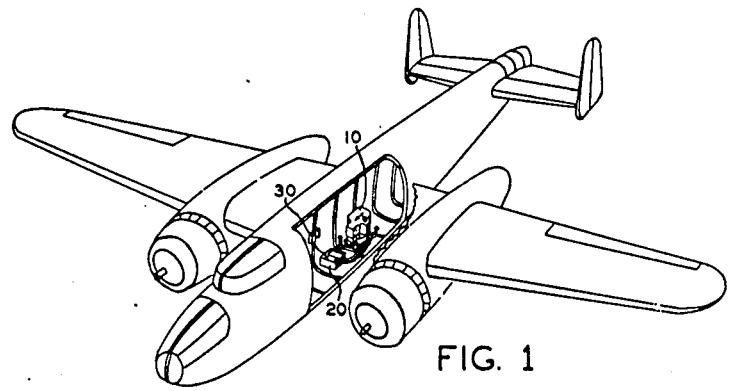
FIG. 1 is a schematic perspective view of the xerographic camera system of the invention as adapted for installation in an aircraft.
Figure 2:
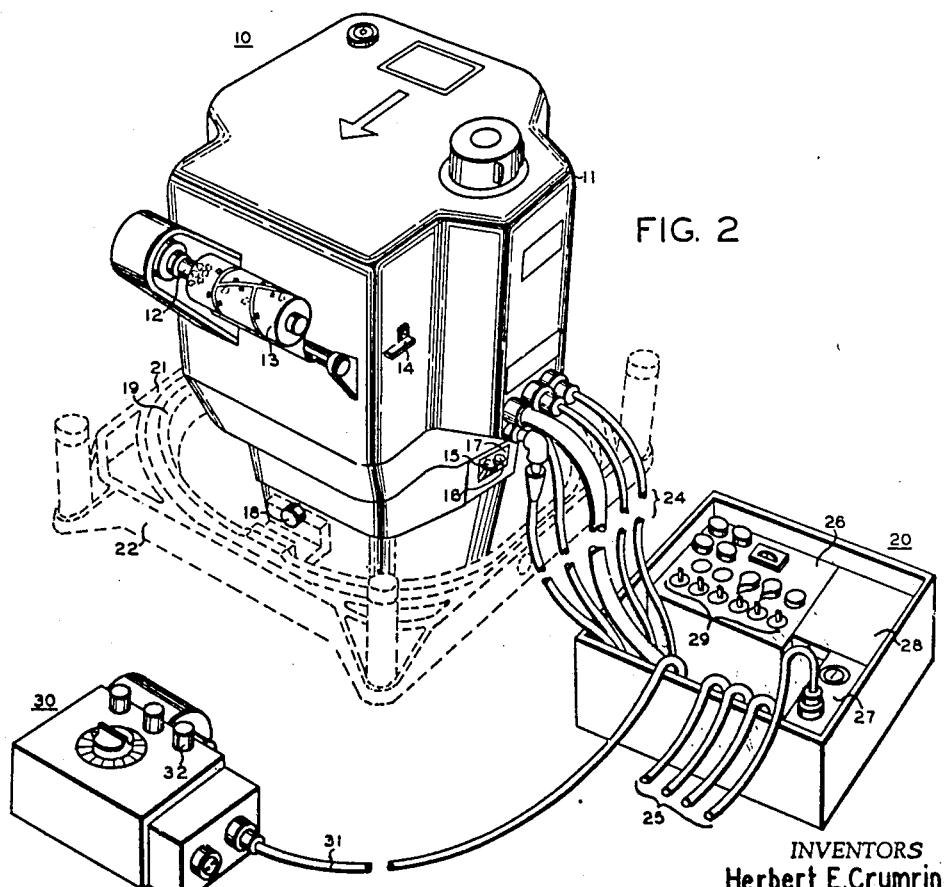
FIG. 2 is an enlarged perspective view of the several components of the xerographic camera system of the invention.

In the particular embodiment shown in the drawings (see FIGS. 1 and 2) the invention is adapted for installation in an aircraft, and is shown as comprising a xerographic camera 10, containing a lens and shutter mechanism as well as all xerographic processing equipment; a control unit 20, wherein the several pneumatic and electrical control circuits of the system are housed; and an intervalometer 30, for initiating operation of the system. The camera and processing mechanism is preferably housed in a cast magnesium cover assembly 11 that is separable substantially at its mid-section to permit access to the interior of the apparatus. Within the housing, two spaced side plates or frames are integrally connected by tie rods to form a rigid framework for supporting the several components of the xerographic processing equipment.

On the front wall of the exterior of housing 11 there is located a power-driven, take-up roll spindle 12 for storing aerial xerographs 13 taken and processed by the apparatus. A lever 14 is provided to actuate a web cutter inside the housing, whereby finished xerographs may be detached from those in process. Manually settable knobs 15 and 16 project through an opening 17 to permit adjustment of the diaphragm and speed-setting mechanisms, respectively, of the lens and shutter assembly of the camera. On the lower portion of housing 11 there are provided two trunnions 18, at the front and rear of the camera, whereby the camera portion of the system may be supported on the inner gimbal ring 19 of a gyroscopic stabilizing system which, together with an outer gimbal ring 21, is pivotally supported in a shock-mounted frame 22 within the aircraft. By the latter means the xerographic camera is maintained in a proper attitude with reference to the ground for taking aerial xerographs by means of suitable gyroscopically controlled servomotors (not shown) that function to compensate for pitching, rolling and yawing motions of the aircraft.

For actuating the several components of the camera mechanism, a plurality of electrical, pneumatic and vacuum lines 24 connect camera 10 to control unit 20 which, in turn, is connected to the aircraft electrical and pneumatic supplies via a plurality of lines 25. Housed within the control unit is an electrical circuit unit 26 including relay circuits for controlling the various automatic and interlocking functions of the several components of the camera apparatus, a pneumatic control system unit 27 for controlling the operation of a plurality of high pressure air systems and vacuum systems essential to the proper functioning of the camera mechanism, and a dust filter unit 28 for removing xerographic developing powder from air exhausted from the system. A plurality of control knobs and switches 29 are provided on electrical circuit unit 26 for conditioning the system for automatic operation and for testing the several components thereof in accordance with prescribed maintenance requirements. Intervalometer unit 30 is connected to control unit 20 via a cable 31 and is provided with a plurality of setting knobs 32 whereby the camera apparatus may be conditioned for taking single exposures or successive exposures in timed relation, in accordance with conventional aerial photography practice.

Figure 3:
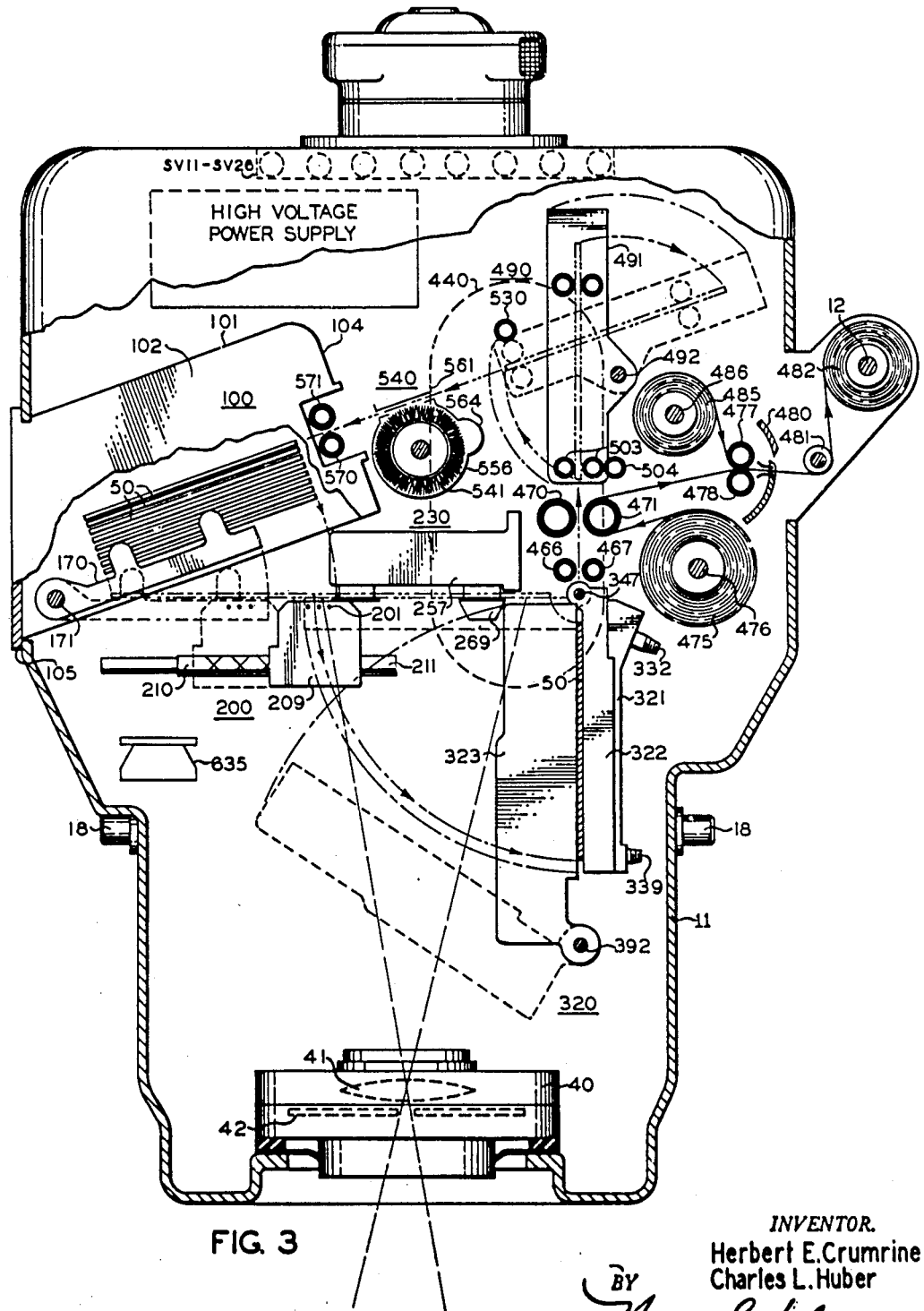
FIG. 3 is a functional schematic cross-sectional view of the xerographic camera and processing apparatus.

The relative arrangement of the several components of the interior of the xerographic camera and processing apparatus are best shown in the schematic sectional view of FIG. 3 wherein a lens and shutter assembly 40 is mounted over an opening in the lower end of housing 11 in a manner to form a light-tight seal with the housing. Assembly 40 includes a lens system 41, a diaphragm 42 which is settable under control of knob 15, as described above, and a shutter mechanism (not shown) that may be cocked and released in accordance with conventional practice in aerial photography.

Figure 4:
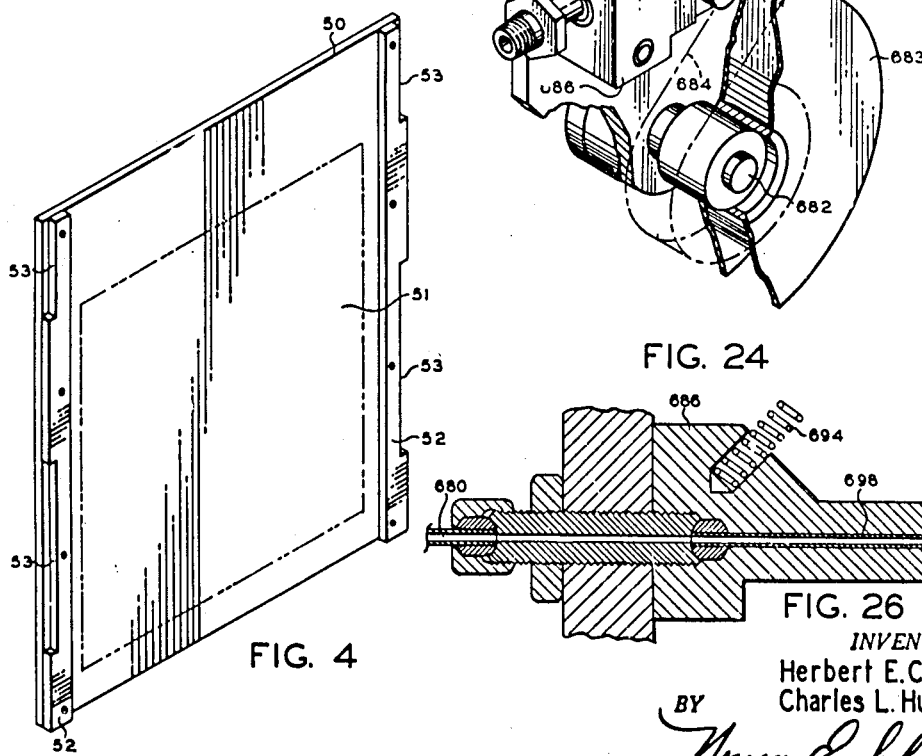
FIG. 4 is an isometric view of a xerographic plate adapted for use in the invention.

For forming xerographic images, the system is provided with a plurality of xerographic plates 50 (see also FIG. 4), each of which comprises a conductive backing plate, preferably of brass, having a photoconductive layer 51, preferably of amorphous selenium, formed on one face thereof. Each plate 50 is provided with two side rails 52 that are integrally secured thereto and are so constructed to position the plate with reference to the several mechanisms with which it cooperates, and to form a recessed area for photoconductive layer 51 to protect a xerographic powder image formed thereon from smearing during transit of the plate through the system.

Prior to their use in the system, a supply of xerographic plates 50 is manually inserted in a magazine assembly 100 which is then placed in the camera wherein it is supported on suitable guide rails (not shown) formed on the framework of the apparatus. From the magazine, plates 50 are passed seriatim over a charging mechanism assembly 200, whereby the photoconductive surface of each plate is given a uniform electrostatic charge, and is then passed to an exposure position mechanism 230 wherein each plate is held momentarily during the exposure period. During exposure a charge pattern or electrostatic latent image, corresponding to the subject being xerographed, is formed on each plate. After exposure, the plate is passed to a development mechanism assembly 320 wherein the electrostatic latent image of the subject is converted to a xerographic powder image thereof. After development each plate is passed through an image transfer assembly 470, wherein its xerographic powder image is transferred to an adhesive support surface, and thence to a direction-changing mechanism 490, whereby the plate is aligned with and passed through a brush-cleaning apparatus 540 wherein residual powder remaining on the photoconductive surface of the plate is removed. After cleaning, the plate is returned to magazine assembly 100 for reuse.

Plate Magazine

The plate magazine comprises a self-contained, light-tight, box-like structure wherein a plurality of xerographic plates are loaded preparatory to use in the system. Preferably, the magazine is of such construction to prevent the admission of light, and is provided with a dark slide covering the bottom opening thereof when the magazine is removed from the camera. When the magazine is placed in position in the system it cooperates with the framework of the machine in a manner such that a light-tight structure is maintained when the dark slide is removed. As an integral part of the magazine structure there is provided a plate spacing and advancing mechanism that is actuated by a motor through a single-revolution clutch, whereby plates fed to the magazine are retained in their respective positions and are released singly from the bottom of the magazine for use in the system. Also forming a part of the magazine structure is a plate transfer mechanism actuated by an air cylinder, whereby plates in the magazine may be withdrawn seriatim and be advanced to the plate charging apparatus.

Specifically, plate magazine assembly 100 (see FIGS. 3 and 5) includes a box-like casting having a cover portion 101, side walls 102 and 103, a front wall 104 and a rear wall 105 that forms a rear cover plate for the camera, and is provided with suitable bosses and interior wall portions for supporting the several components of the magazine mechanism. Before the magazine is inserted in the camera, a supply of xerographic plates 50 is placed therein. The plates are inserted in the magazine through a rectangular opening 106 in front wall 104, with photoconductive layer 51 facing downwardly, and are adapted to be supported within the magazine by four interponent members 107, one of which is fixed on each of two pairs of shafts 108 and 109 arranged on opposite sides of the magazine. Each of the shafts 108 is rotatably mounted in a bearing 110 set in cover portion 101 and a bearing block 111 fixed on the respective side walls 102 and 103. Similarly, each of the shafts 109 is rotatably mounted in a bearing 112 and a bearing block 113.

On the right-hand side of the magazine (as shown in FIG. 5) each of the shafts 108 and 109 has fixed thereto a helical gear 115 that meshes with a similar helical gear 116 fixed on a shaft 117 that is provided at one end with a bevel gear 118 that is driven by a bevel gear 119 fixed on a tubular sleeve 120 that is rotatably mounted in a vertical wall portion 121. Similarly, shafts 108 and 109 on the left-hand side of the magazine are provided with helical gears 123 that mesh with gears 124 fixed on a shaft 125 that is provided with a bevel gear 126 that meshes with a bevel gear 127 fixed on a tubular sleeve 128 that is rotatably mounted in a vertical wall portion 129. Tubular shafts 120 and 128 form part of a single-revolution clutch mechanism 130, described below, whereby power from the drive mechanism of the camera is transmitted via a sprocket 132, shaft 133, pinion 134, gear 135, shaft 136, and the clutch mechanism to effect intermittent rotation of the shafts 117 and 125 whereby xerographic plates may be released from interponent members 107, as described below.

For supporting xerographic plates after they are released by interponent members 107, hook members 138 and 139 are provided on each side of the magazine, each of which is pivotally suspended from an associated block 140 that is secured to the inner face of the side walls 102 and 103. Each of the hook members is resiliently urged inwardly against the plates in the magazine by a suitable spring (not shown) and is provided with a hook portion that underlies the lowermost plate in the plate stack when the parts are in the position shown in FIG. 5.

The single-revolution clutch mechanism 130 is an adaptation of a conventional form of single-revolution clutch such as that used in the shutter winding mechanism of the K-17 aerial camera. Briefly, it constitutes a solenoid-actuated device which, upon energization of the solenoid, serves to engage the several operating mechanisms of the magazine with a constantly rotating shaft, during a single revolution thereof, to effect the required actuation of such mechanisms. As shown in FIG. 5, the clutch mechanism includes a pair of side plates 145 and 146 that are held together for unitary movement by pins 147 and are fixed respectively to sleeves 120 and 128 which are rotatably mounted on drive shaft 136. In the space between side plates 145 and 146, there is a ratchet 148 that is fixed on drive shaft 136 and rotates constantly therewith. Cooperating with the ratchet 148 is a ratchet pawl 149 that is pivotally mounted on a stud 150 extending between the side plates, and is resiliently urged into engagement with the ratchet by a three-armed lever 152 that has a lug extending over a tail portion of ratchet pawl 149 and is resiliently connected to the ratchet pawl by a spring 153 that is extended between a stud on the lever and a stud on the pendant end of the ratchet pawl. The entire pawl and lever assembly is resiliently urged clockwise about stud 150 by a spring 154 extended between the upwardly extending end of lever 152 and a stud secured on side plate 146. When the clutch mechanism is disengaged, as shown in the drawings, ratchet pawl 149 is held out of engagement with ratchet 148 by a holding pawl 155 that underlies a forward extension on ratchet pawl 149. The upper end of holding pawl 155 is pivotally mounted in a bracket 156, that is secured to the underside of cover portion 101, and is pivotally connected at its midportion to a spring-urged armature 157 of a solenoid SOL-X, that is also secured on cover 101.

When the clutch is inactive, the several parts thereof remain in the position shown so that ratchet 148 rotates freely with drive shaft 136. When the clutch is to be activated, solenoid SOL-X is energized, thereby drawing armature 157 inwardly against the tension of its spring and disengaging holding pawl 155 from ratchet pawl 149.

When this occurs, the ratchet pawl is rotated clockwise about stud 150 by its actuating spring 154 and engages ratchet 148 on drive shaft 136, whereby side plates 145 and 146 are caused to rotate as a unitary structure with the drive shaft and thereby serve to actuate the several associated mechanisms.

The particular circuitry employed to control the actuation of clutch mechanism 130 is such that solenoid SOL-X is energized only momentarily to initiate the clutch operation and is immediately deenergized so that the spring on armature 157 urges holding pawl 155 to a position to re-engage ratchet pawl 149. To prevent interference with other elements of the mechanism, holding pawl 155 is provided with a pin 158 that rides on the outer edges of plates 145 and 146 to retain the pawl in ineffective position during a substantial portion of the movement of the plates. However, as side plates 145 and 146 approach the completion of a single revolution, pin 158 rides onto low portions 159 of the side plates and permits holding pawl 155 to engage the forward extension of ratchet pawl 149 and thereby disengage it from ratchet 148. It should be noted that holding pawl 155 first engages the forward extension of lever 152 to pivot it about stud 150 and thereby tension spring 153 connecting the lever with ratchet pawl 149. As a result of this tensioning, when holding pawl 155 disengages ratchet pawl 149 from ratchet 148, spring 153 snaps the ratchet pawl to its counterclockwise position to effect a complete disengagement of the parts and to prevent interference between the ratchet and the ratchet pawl as the ratchet continues to rotate with shaft 136.

In this position of the parts it may be noted that the ratchet pawl spring 154, through the interaction of lever 152 and ratchet pawl 149, tends to rotate the ratchet pawl into engagement with ratchet 148. Specifically, spring 154 urges the forward end of the ratchet pawl on holding pawl 155 as a fulcrum and tends to rotate the entire clutch assembly, including side plates 145 and 146, in a counterclockwise direction. However, the relatively light spring pressure exerted by ratchet pawl spring 154 is completely overcome by the substantially greater pressure exerted by a restoring spring 161 that maintains a cam follower arm 162 engaged with a cam 163 fixed on sleeve 128. In this position of the parts, cam 163 is at its dead center position with reference to cam arm 162 and provides a spring biased locking action to hold the clutch mechanism in its inactive position until pawl 149 is again released by solenoid SOL-X.

Cam follower arm 162 is fixed on a shaft 164 that is journalled in suitable bearings in vertical wall positions 121 and 129, and is provided with roller bearing arms 165 and 166 fixed thereon. By this arrangement, the rocking motion imparted to shaft 164 by cam 163 during the rotation of clutch mechanism 130 is utilized, via arms 165 and 166, to exert downward pressure on the uppermost xerographic plate 50 in the magazine to ensure proper downward feeding of the plates.

In order to withdraw the lowermost plate from the plate supply, magazine assembly 100 is provided with a plate transfer mechanism that includes two transfer arm assemblies 170 of mirror-image conformation that are rotatably mounted on a shaft 171 which, in turn, is rotatably mounted in side walls 102 and 103 of the magazine. Fixed on the end of shaft 171 is a bifurcated arm 172 which, when the magazine is in operating position in the apparatus, engages a pin 173 (see FIG. 6) in a clevis 174 that is fixed on the piston rod 175 of an air cylinder A which, in turn, is fixed on a bracket 176 secured to the frame of the machine. Air cylinder A may be activated in timed relation to the remainder of the apparatus, as described below to retract piston rod 175 to rock shaft 171 counterclockwise to move transfer arm assemblies 170 upwardly, as shown in FIG. 3, or to extend rod 175 to rock shaft 171 clockwise to move assemblies 170 downwardly, as shown in FIGS. 5 and 6, and in dotted lines in FIG. 3.

The transfer arm assemblies 170 are integrally connected near their forward end by a rod 178 and each is provided with a rail portion 179, for supporting a xerographic plate 50, and with an offset portion 180 whereby, when the arm is moved to its upper position, interference is avoided with the lower end of the associated shaft 108. In addition, each transfer arm 170 includes two cam portions 181 and 182 which coact with corresponding cam surfaces formed on the lower ends of the associated hook members 138 and 139 whereby, when arms 170 are moved upwardly, cam surfaces 181 and 182 are effective to move their associated hook members outwardly to release them from engagement with the xerographic plate supported thereby. Also forming a part of each transfer arm assembly 170 is a spring-urged latch mechanism including a latch member 185 (see also FIG. 7) that extends through an opening in the arm and is resiliently urged to its inner position by a leaf spring 186 fixed on an upwardly projecting arm 187 of the assembly. Each latch member 185 is arranged a sufficient distance above the upper surface of its associated support rail 179 so that a xerographic plate can be accommodated between the upper surface of the rail and the lower edge of the latch member. In addition, each latch member 185 is provided with an inclined upper surface whereby, as arms 170 are moved upwardly to engage a plate, each latch member 185 is cammed outwardly until it passes over the plate and then is moved inwardly by its spring 186 so that it latches over the upper surface of the plate.

By means of the mechanism thus far described, the operation of the plate transfer mechanism can be clearly visualized by reference to FIGS. 3, 5, and 6. If it be assumed that the xerographic plate held by the plate transfer mechanism, as shown in FIGS. 5 and 6, is removed in the normal operation of the machine, and that a suitable signal is received to retract air cylinder A to obtain another plate from the supply in the magazine, the operation is as follows: As piston rod 175 of air cylinder A is retracted, shaft 171 is rocked counterclockwise to move transfer arm assemblies 170 upwardly, as described in detail below. During their upward movement, cam surfaces 181 and 182 rock hook members 138 and 139 outwardly to permit the xerographic plate 50 held thereby to be seated on rails 179 of the transfer arm assemblies. Simultaneously, latch members 185 are cammed outwardly against the tension of their springs 186, as the plate passes thereby, and immediately latch over the upper surface of the plate. At the end of the upward movement of transfer arm assemblies 170, the lowermost xerographic plate 50 in the magazine is thus supported on guide rails 179 and is held thereagainst by latch members 185, while hook members 138 and 139 are held disengaged from the plate and interponent members 107 underlie the lowermost of the remaining plates in the magazine.

At this point in the operation, piston rod 175 of air cylinder A is extended to rotate shaft 171 clockwise and thereby move transfer arm assemblies 170 downwardly. Since the xerographic plate supported by guide rails 179 is now held thereagainst by latch members 185, it moves downwardly with the transfer arm assemblies. As this occurs, hook members 138 and 139 are released by their respective cam surfaces 181 and 182 and move inwardly until the upwardly extending portion immediately above the hook portion thereon abuts the edges of the remaining xerographic plates which are now supported on interponent members 107. As transfer arm assemblies 170 reach their lower limit of movement, as determined by an adjustable limit stop 188, the right-hand assembly actuates a microswitch SW-13 that is effective simultaneously to initiate the operation of the shutter winding mechanism and to initiate the operation of the plate charging mechanism, as described below, and, in addition, to initiate the operation of single revolution clutch mechanism 130 to advance another plate into position in the magazine for utilization in the next cycle of operation. Clutch mechanism 130 functions, as described above, to rotate shafts 108 and 109 through a single revolution during which interponents 107 are momentarily removed from beneath the plates supported thereby to permit the entire supply of plates to drop downwardly and rest on hook members 138 and 139. The parts are so arranged that the plate supply moves downwardly a distance equivalent to the thickness of a single plate. Thus, as shafts 108 and 109 complete their revolution of movement, interponent members 107 are moved above the plate now supported by hooks 138 and 139 and are again in a position to support the remaining supply of plates when the lowermost plate is next removed. By this arrangement it is apparent that only a single plate is metered downwardly during each operation of single revolution clutch mechanism 130.

For actuating transfer arm assemblies 170 and for advancing a new plate 50 for use in the apparatus, the plate transfer mechanism includes a lost-motion actuating connection whereby assemblies 170 are raised and lowered, as desired, and whereby the plate is partially ejected from transfer arm assemblies 170 and is caused to engage with the drive rolls of the exposure position mechanism. For this purpose, the plate transfer mechanism includes a slide 190 associated with each of the transfer arm assemblies 170 that is provided with elongated slots 191 and 192 whereby it may move horizontally on shaft 171 and rod 178. In addition, each slide 190 has an upwardly extending portion 193 provided with a slot 194 that encompasses a pin 195 fixed in a crank arm 196 fixed on shaft 171. Furthermore, each slide is provided with a shoulder portion 197 to engage the trailing edge of a xerographic plate 50 held by the transfer arm assemblies 170. The arrangement of slots 194 in slides 190 is such that crank arms 196 impart no motion to the slides during the first portion of movement of the transfer arm assemblies. However, toward the end of the movement imparted by air cylinder A, pins 195 in cranks 196 actuate slides 190 and move them forwardly relative to transfer arm assemblies 170, whereby shoulders 197 on the slides push the plate forwardly on guide rails 179. The amount of movement imparted to the plate at this point is relatively slight but is sufficient to engage the leading edge of the plate with a pair of continuously rotating drive rollers of the exposure position mechanism 230, whereby the plate is gripped by the rollers and moved forwardly from the plate transfer mechanism.

At the end of a cycle of operation on a xerographic plate, during which it is charged, exposed, developed, subjected to image transfer, and cleaned, as described in detail below, the plate is ultimately engaged by drive rolls 570 that are mounted on a driven shaft 619 and cooperate with rolls 571 to return the plate to magazine 100. As the plate enters the magazine it is fed on top of the remaining plates therein in a manner such that its leading edge actuates a microswitch SW-11 to initiate a cycle of operation of single revolution clutch mechanism 130, and the plate itself tends to rest on the remaining plates but is momentarily upheld by interponent members 142 fixed on each of the shafts 109. During the ensuing cycle of operation of clutch mechanism 130, shafts 108 and 109 are driven through a single revolution, as described above, whereby interponents 142 are momentarily moved from beneath the returned plate and permit it to fall on the plates therebeneath. As shafts 109 complete their revolution of movement, interponents 142 are restored to the position shown in FIG. 5, wherein they overlie the newly returned plate. By this arrangement, the entire supply of plates in magazine 100 is secured against excessive movement or displacement regardless of the attitude of the aircraft in which they are carried. It should be noted that the operation of single revolution clutch mechanism 130 also momentarily removes interponent members 107 from their positions between the two lowermost plates. However, since the entire supply of plates is supported by hook members 138 and 139 at this point of operation, the movement of interponent members 107 does not affect the position or alignment of the xerographic plates in the magazine.

*Plate Charging Mechanism*

The plate charging mechanism includes a scorotron or screened corona discharge device which is preferably an adaptation of that disclosed in Walkup Patent No. 2,777,957, issued January 15, 1957, and includes a single wire connected to a high voltage source to produce a corona discharge and is provided with a biasing wire screen between the corona emitting wire and the plate position to control the intensity of the discharge. The scorotron is mounted on a movable carriage that is supported on suitable ways for longitudinal movement relative to the plate exposure position. In the particular embodiment disclosed, in order to conserve space in the machine, the scorotron is retracted from its normal charging position during periods other than the charging period in order to avoid interference with mechanisms described below. Prior to the transfer of a plate from the magazine to the exposure position the scorotron is advanced to its charging position by means of a motor-driven lead screw that coacts with a crosshead on the scorotron and is engaged therewith at predetermined intervals by a suitable clutching mechanism. When the scorotron is in its charging position the uncharged xerographic plate is advanced by the plate transfer mechanism to engage drive rolls that move the plate toward the exposure position at a uniform rate. Simultaneously, the scorotron is returned toward its retracted position whereby the plate passing thereover receives a uniform electrostatic charge over its photoconductive surface.

The specific apparatus for effecting plate charging is best shown in FIG. 6, in conjunction with the plate transfer mechanism, wherein the charging apparatus comprises a conventional scorotron-type corona discharge apparatus that is conventionally employed in xerographic apparatus. Briefly, a scorotron comprises a continuous corona discharge wire 201 that is supported by two insulating blocks 202 and 203 that are mounted on a channel-shaped carriage member 204. A screening grid comprising a continuous wire 206 is also supported between insulating blocks 202 and 203, and is positioned intermediate corona discharge wire 201 and the path of movement of a xerographic plate. Carriage member 204 is supported for movement in a direction parallel to that of the xerographic plate by means of an extension member 207 at one end that slides in a channel 208 fixed to the frame of the machine, and at its other end on a crosshead 209 that rides on and is driven by a doubly threaded reversing screw 210 formed on a shaft 211 that is rotatably mounted in a bracket 212 secured to the frame of the machine. A gear 214 is fixed at one end of shaft 211 and is driven intermittently via a pinion 215 by the drive mechanism of the apparatus, as described below. A switch actuating member 216 is fixed on the rearward face of crosshead 209 and extends downwardly to contact the actuating plunger of either a switch SW-15 or a switch SW-16 which are located on bracket 212 at opposite ends of the limits of movement of crosshead 209.

High voltage potential is applied to corona wire 201 via a shoe 220, secured on insulating block 202, that rides on a bus bar 221 supported on insulators 222 mounted on the right-hand frame plate of the machine. Shielding wire 206 is held at biasing potential via a suitable connection with a shoe 224 fixed on insulating block 203 that is arranged in sliding contact with a bus bar 225 fixed on the left-hand frame plate of the machine. Carriage member 204 is maintained at ground potential by means of a spring contact 227 that coacts with the underside of channel 208.

In conventional constructions of scorotron-type charging devices for xerographic plates, it is customary either that the plate is moved relative to the corona discharge wire or that the discharge wire is moved relative to the plate in order to obtain a uniform charge deposit on the surface of the plate. In the present arrangement, in order to conserve space in an airborne equipment, it is preferable to retract the corona carriage to a position in which it cannot interfere with other mechanisms of the apparatus during periods other than those in which a plate is charged, and to move it to a charging position immediately prior to the time that charging is to occur. For this purpose interlocking relay circuits are provided, as explained below, to control the position of carriage member 204 at all times.

In normal functioning of the machine, the corona carriage is positioned at its forward limit of travel, as shown in FIG. 6, wherein switch-actuating member 216 actuates switch SW-16, at the time that the plate transfer mechanism withdraws a new plate from the magazine and moves it toward the exposure position. As transfer arm assembly 170 actuates switch SW-13, a circuit is established to engage a clutch in the drive connection to shaft 211 whereby the shaft is rotated and starts to move carriage member 204 rearwardly at a constant speed. Simultaneously, actuating slides 190 of the transfer mechanism are effective to move the leading edge of the xerographic plate into engagement with continuously rotating drive rolls of the exposure position mechanism whereby the xerographic plate is gripped and is moved forwardly at a constant rate. By this arrangement the plate passes over corona wire 201 at a constant rate as it is being moved to the exposure position. The several driving ratios are such that corona carriage 204 reaches its rearmost limit of movement immediately after the trailing edge of the plate has passed the corona wire. At this point actuating arm 216 on crosshead 209 is effective to actuate switch SW-15 which is effective to de-energize the clutch in the shaft driving connection for shaft 211, whereby carriage member 204 is stopped at its rearmost position. Simultaneously, switch SW-15 is also effective to initiate a time delay circuit to provide a predetermined time delay prior to operation of the developing mechanism as explained below.

*Exposure Position Mechanism*

In order to expose xerographic plates 50, each is passed to an exposure position mechanism whereby it is maintained in the focal plane of the camera during the period that exposure takes place. This is accomplished by means of a pair of drive rolls that are supported on pivotally mounted frames and are adapted to engage the leading edge of the plate when it is advanced by the plate transfer mechanism. These drive rolls advance the plate to a position in alignment with the camera lens and into engagement with a pair of idler rolls that are mounted on the same frames as the drive rolls and serve to effect lateral alignment of the plate. Suitable stops are provided to limit the longitudinal advancement of the plate when it arrives in the exposure position. In order to hold the plate firmly and accurately in the focal plane of the camera, a vacuum device is actuated when the plate reaches its exposure position and is effective to support the plate independently of the drive and idler rolls. The plate is maintained in this position until the exposure is completed and the plate is transferred to the development chamber assembly.

The exposure position mechanism 230 (FIG. 8) is based on a rectangular plate 231 that is substantially centered with respect to the optical axis of the lens system of the camera, and is suspended between the side frames of the machine on four brackets 232, one of which is mounted substantially at each corner of the plate. On the underside of plate 231 there is provided a circular milled groove for seating an O-ring 233 against which xerographic plates 50 are held during exposure. A second circular groove 234 milled in the underside of plate 231 within the periphery of O-ring 233 is connected by tubing 235 and certain control valves, described below, to the vacuum system of the aircraft whereby a vacuum may be drawn to draw a xerographic plate tightly against O-ring 233 whereby it is held in the focal plane of the camera system.

For advancing xerographic plates with reference to plate 231, there are provided two sets of flanged drive rolls that are substantially symmetrically arranged on either side of the plate. For supporting the drive roll on the left side of plate 231, as shown in FIG. 8, there is provided a cradle assembly 237 that is supported for rocking movement on shaft 238 which passes through bearings 239 and 240 located, respectively, in an end wall 241 and center wall 242 of the cradle and, in turn, is rotatably mounted in bearings 243 and 244 seated in the associated brackets 232. The drive roll itself comprises a rubber-covered roll portion 246 having an annular flange 247 and is fixed on a shaft 248 that is rotatably mounted in bearings 249 and 250 seated in cradle 237. Roll 246 is driven in a counterclockwise direction by means of a bevel gear 251 fixed on shaft 248 that engages a bevel gear 252 fixed on shaft 238 which, at its opposite end, is driven by means of bevel gears 253 and 254 from a shaft 255 that is journalled in the frame plates of the machine and is continuously rotated by the drive mechanism, as described below.

On the opposite side of backing plate 231 is a cradle 257, substantially similar to cradle 237, that is similarly supported for rocking movement by a shaft 258 that extends through bearings 259 and 260 that are seated respectively in cradle 257 and the associated brackets 232 in the same manner as the corresponding bearings for cradle 237. A drive roll 261, similar to drive roll 246 and having an annular flange 262, is rotatably mounted in cradle 257 on bearings 263 and 264 and is arranged to be driven continuously clockwise via shaft 265, bevel gears 266, shaft 258, bevel gears 267, and shaft 255.

Also supported on each cradle 237 and 257 is an idler roll 269 that is fixed on a short shaft 270 that is mounted for rotational movement in its respective cradle in a bearing 271. Each roll 269 is provided with an annular flange portion 272 for guiding xerographic plates 50, and an inverted truncated cone portion 273, whereby the respective cradle assemblies may be cammed outwardly to disengage plates held in the exposure position by a cam element on the development electrode assembly, as described below. Cradles 237 and 257 are resiliently urged about their pivotal axes by springs 274 and 275, respectively, each of which is extended between a stud fixed in the cradle and a stud secured on plate 231 whereby the drive and idler rolls of both cradles are urged inwardly toward plate 231. Suitable limit stops (not shown) limit the movement of the cradles so that the lateral distance between the respective sets of rolls thereon is slightly less than the width of a xerographic plate.

By the arrangement thus far described, a xerographic plate 50 advanced from the plate transfer mechanism and over the plate charging apparatus is engaged by continuously driven rolls 246 and 261 and is driven forwardly between idler rolls 269, the annular flanges on each roll serving to prevent the plate from falling out of engagement with the rolls. As xerographic plate 50 continues its advance, its leading edge engages a hook portion 277 on a slide member 278 that is provided with a forward slot 279 encompassing a pin 280 fixed in a crank arm 281 secured on a rock-shaft 282 that is resiliently urged to its counterclockwise limit of movement by a spring 283. The rearward end of slide 278 is provided with a slot 285 that encompasses a pin 286 supported by a bracket 287 that is secured to the upper surface of plate 231. A spring 288 extended between slide 278 and a stud 289 fixed on the plate urges slide 278 rearwardly to the limit of movement permitted by slot 285. In this position of slide 278, the rearward shoulder of a cut-out portion 290 thereon abuts a lever 291 that is pivotally mounted on a stud 292 fixed on plate 231 and is provided with a switch-actuating arm 293 that engages the actuating element 294 of a microswitch SW–17. Lever 291 is also provided with a hooked portion 295 that engages a latching shoulder 296 on a cam plate 297 that is pivotally mounted on a stud 298 on plate 231 and is resiliently urged counterclockwise by a spring 299 extended between a stud 301 on the cam plate and a stud 302 on plate 231. A camming extension 303 on cam plate 297 extends over the edge of plate 231 and abuts the inner face of the lower edge of cradle 257 whereby, upon subsequent release of cam plate 297, extension 303 is effective to rock cradle 257 counterclockwise about its pivotal axis.

The continued forward movement of the xerographic plate pulls slide 278 forwardly therewith until the plate reaches a position at which it is aligned with but is supported immediately below its ultimate exposure position. This motion of slide 278 causes the rearward shoulder of cut-out portion 290 on the slide to engage lever 291 and to move the lever in a clockwise direction about stud 292 to cause arm 293 to actuate switch SW–17 and, immediately thereafter, to disengage hooked portion 295 from latch portion 296 on cam plate 297. The actuation of switch SW–17 energizes a relay circuit, described below, which is effective to initiate the actuation of controls to cause a vacuum to be drawn on the underside of plate 231, via tube 235, whereby the xerographic plate is drawn upwardly into engagement with O-ring 233. The release of latch 296 permits spring 299 to rotate cam plate 297 about stud 298 to force extension 303 on the cam plate against cradle 257 thereby rocking the cradle outwardly against the tension of its spring 275 to disengage drive roll 261 from driving engagement with the edge of the plate. By the foregoing actions, the xerographic plate is firmly seated and maintained in its exposure position by atmospheric pressure and the drive rolls are disengaged therefrom to minimize vibration.

The xerographic plate is maintained in the exposure position for a predetermined time period, during which the camera shutter is tripped to make the desired exposure. In timed relation thereto, the cycle of operation of the development mechanism is automatically initiated, during which the development electrode assembly is moved upwardly to withdraw the exposed xerographic plate from its exposure position. During this movement, as described below, a collar 305 having a pin 306 overlying a lever 307 fixed on shaft 282 is rocked clockwise. Simultaneously, suitable cam plates on the development electrode assembly engage the inverted truncated cone portions 273 of idler rolls 269 and cam them outwardly from plate 231, whereby cradles 237 and 257 are each rocked outwardly about their respective axes of rotation to remove the flanges of the drive and idler rolls from beneath the xerographic plate. The rocking of cradles 237 and 257 permits unimpeded removal of the xerographic plate from the exposure position, as described below. The rocking of collar 305 is effective, through lever 307, to rock shaft 282 clockwise against the tension of its spring 283 to reset the exposure mechanism to a condition to receive another xerographic plate.

The resetting action is accomplished, as follows: The clockwise rocking of shaft 282 is effective through crank 281 and pin 280 to elevate the forward end of slide 278 whereby hook 277 is disengaged from the leading edge of the xerographic plate held in the exposure position. Upon disengagement of hook 277, slide 278 is partially restored to its rearward position by spring 288, whereby the forward shoulder of cut-out portion 290 on the slide engages lever 291 and rocks it counterclockwise about stud 292 sufficiently to disengage arm 293 from switch-actuating element 294 whereby switch SW–17 is opened. The opening of switch SW–17 is effective to release the vacuum applied to the xerographic plate by tubing 235 whereby the xerographic plate is conveniently released for further manipulation. Complete restoration of slide 278 to its rearward position is temporarily blocked by hook portion 295 of lever 291 which momentarily engages a flat portion of latch 296. However, as shaft 282 completes its clockwise motion, a crank 309 fixed thereon is effective to rock cam plate 297 counterclockwise by means of an off-set link 310 that is pinned to crank 309 and is connected to cam plate 297 with a pin-in-slot connection. The action of crank 309 restores cam plate 297 to its original position against the tension of spring 299, and spring 288 is effective to draw slide 278 to its rearmost limit of movement to rock lever 291 counterclockwise to engage hook 295 with latch 296. Shortly thereafter, in the normal cycle of operation, collar 305 is restored to its original position to release lever 307 whereby shaft 282 is rocked counterclockwise by its spring 283, thereby restoring the entire exposure position mechanism to the condition shown in FIG. 8, in which its several elements are in position to receive a succeeding xerographic plate for exposure.

*Developing Assembly*

In order to effect development of the latent electrostatic image on each xerographic plate, the system includes a substantially gas-tight developing assembly wherein development is completed. For this purpose a development electrode comprising an aluminum frame, having a brass insert for coaction with the xerographic plate, is pivotally mounted at its upper end at a point beneath and to the side of the focal plane of the camera and is arranged to be rotated about its pivotal mounting by a linkage mechanism, actuated by an air-driven cylinder, to engage with each xerographic plate after its exposure. Coacting with the development electrode is an electrode cover assembly which includes a box-like casting having four sides and a cover integrally connected thereto that is pivotally mounted at its lower end in the frame of the machine. A resilient O-ring is set in a suitable groove in the electrode assembly and is adapted to engage the edges of the cover assembly to form a substantially gas-tight chamber when the electrode assembly and the cover assembly are brought together. The cover assembly is actuated by a second air cylinder to move the cover out of the path of movement of the electrode assembly when the electrode assembly is rotated to engage a xerographic plate. This action is effected after the exposure of a xerographic plate and permits the electrode assembly to move to a position adjacent to the exposure position where suitable latches mounted on the electrode assembly engage the plate. At the same time, the drive and idler rolls of the exposure position mechanism are cammed out of their plate-retaining position and the vacuum holding the plate in its exposure position is released, thereby permitting the plate to be supported entirely by the electrode assembly. When this occurs the electrode assembly actuating cylinder returns the assembly to its vertical position and the cover actuating cylinder rotates the cover assembly to its vertical position to engage the plate with the electrode assembly to form a gas-tight chamber.

Thereafter, developing powder is injected into the development chamber from a suitable powder cloud generator for a sufficient period of time to complete the development of the latent image on the plate. When development is complete, the output of the powder cloud generator is cut off and the development chamber is vented to draw ambient air through the chamber to clean it of substantially all the powder remaining therein. Such excess powder is normally trapped in a filter or may be passed outside the aircraft by means of a venturi. When the residual powder cloud is substantially dissipated, the cover actuating cylinder is operated to open the cover a slight extent and permit the plate to be advanced upwardly by a plate actuating mechanism to engage its leading edge with a pair of drive rolls which thereupon remove the entire plate from within the developing assembly. As soon as the plate is removed the cover assembly is re-engaged with the development electrode to re-form a substantially gas-tight container and high pressure air is injected into the chamber to remove residual powder adhering to the development electrode and other portions of the inner surfaces of the development chamber assembly. As before, this air is suitably vented to the exterior of the aircraft. As an incident to this scavenging operation, a spring driven brush assembly is passed over the surface of the development electrode to dislodge any developer powder that is not removed by the high pressure air stream, thereby restoring the development electrode to a condition properly to coact with a xerographic plate during the next developing operation. When the cleaning and scavenging step is completed the development assembly chamber is in condition to receive the next xerographic plate.

Structurally, the developing assembly 320 (see FIGS. 3, 9, 10 and 11) includes three major component assemblies, namely, a base assembly 321, with reference to which the remaining assemblies are mounted and which includes the required inlet and outlet connections for the developing material powder cloud and pressurized air; a development electrode assembly 322 which includes a development electrode and xerographic plate positioning and actuating mechanism; and a cover assembly 323, which includes a brush cleaning mechanism for cleaning the development electrode after a development cycle.

Base assembly 321 includes a rectangular plate 330 that is secured on a plate 331 that is rigidly connected between the side plates of the apparatus. In its upper portion there is provided a tapped hole to accommodate a tubing connection 332 from the powder cloud belt generator and which communicates with a hole 333 that extends through the casting to its outer face, whereat it is encompassed by an encircling O-ring 334 that is set into a milled groove in the casting. Similarly, a second inlet opening is provided for connection to an air line 335 whereby ambient air or pressurized air may be directed through two horizontal slots 336 in the forward face of the assembly. An oblong O-ring 337 is seated in the face of the casting and encompasses the two horizontal air inlet slots 336 as well as the entire powder cloud inlet opening 333 and its associated O-ring 334. At the bottom of the base assembly there is an outlet hole 338 which is provided with suitable tubing connections 339, whereby residual powder in the developing chamber may be purged to a dust collector and whereby ambient air may be permitted to enter the developing chamber. At the forward face of the base plate an elongated horizontal groove 340 is formed in the face of the plate and connects with outlet hole 338. Groove 340 is surrounded by an oblong O-ring 341 that is also recessed in the base plate assembly.

The development electrode assembly 322 constitutes an adaptation of that disclosed in Carlson Patent No. 2,690,394, issued September 28, 1954, whereby a metallic plate may be arranged in spaced relation to a xerographic plate that is to be developed and is maintained at a selected potential with reference to the electrostatic image formed on a xerographic plate. This arrangement neutralizes the effect of fringing fields between areas of differing charge whereby, when a developing material is electrostatically charged oppositely to the electrostatic latent image and is brought into surface contact therewith, the developing material particles adhere to the image surface in differing densities depending solely upon the amount of charge in any given portion of the latent image.

In the particular embodiment shown in the drawings, the development electrode assembly includes a rectangular aluminum casting 345 provided with upwardly and outwardly extending bosses 346 having pivot shafts 347 and 348 fixed therein that extend into suitable journal bearings in the side plates whereby the electrode assembly is suspended for rocking movement about its pivots. The rearward face of casting 345 is milled to a completely flat surface whereby, when the development electrode assembly is rocked to its vertical position about its pivots, its rearward face makes uniform contact with each of the O-rings 333, 337 and 341 mounted in base plate 330.

The development electrode itself comprises a flat brass plate 350 that is set into a recessed area milled on the front surface of casting 345 whereby the outer face of the brass plate is substantially flush with the remainder of the casting. Suitable electrical connections are provided (not shown) whereby the plate may be biased to the desired potential during developing operations.

In order to provide a suitable chamber 351 for the entrance of developing material and high pressure air, as required, a horizontal groove is milled in the forward face of the casting immediately above the area occupied by brass plate 350. For admitting a powder cloud of developing material to chamber 351, a hole 352 is drilled from the bottom of the groove through the development electrode casting which, when development electrode assembly 322 is in its vertical position, is substantially aligned with powder cloud inlet hole 333 of base plate 330 and is completely within the area enclosed by O-ring 334 so that none of the developing material can escape. For admitting high pressure air for purging the development chamber, a plurality of holes 354 are drilled within the groove and are aligned respectively with horizontal slots 336 in base casting 330. All of the holes 354 are contained within the area encompassed by oblong O-ring 337 so that high pressure air cannot escape to the exterior of the machine, and are isolated from the powder cloud line by O-ring 334.

In order to permit the removal of residual powder from the developing chamber, a powder collecting groove 356 is milled on the forward face of the casting immediately beneath the area occupied by brass plate 350 and is provided with a plurality of holes 357 that extend through the casting and communicate with the chamber formed by oblong O-ring 341 between the development electrode assembly and base assembly casting 345 and plate 330. By this means, residual powder in the development chamber may be purged to a dust collector by means of high pressure air.

Surrounding the entire area occupied by inlet chamber 351, outlet chamber 356, and development electrode 350 is a rectangular O-ring 358 that is set in a suitable groove milled in the face of development electrode casting 345, whereby an air-tight seal may be made between a xerographic plate 50 or the cover assembly, as described below. O-ring 358 is also effective to insulate development electrode 350 from the surface of a xerographic plate and to provide the correct spacing therebetween during a developing operation.

For supporting a xerographic plate 50 relative to the development electrode 350, the assembly includes two resiliently urged slides 360 (see FIGS. 9 and 10) that are slidably supported at opposite sides of development assembly casting 345 on brackets 361 that are fixed to the casting. Each of the slides 360 is urged toward the pivoted end of casting 345 by a spring 362 that is extended between a pin fixed on a projection 363 on the slide and a second pin fixed on an extension 364 secured to casting 345. Each slide 360 is provided with an outwardly extending follower member 365 that cooperates with a cam surface 366 secured on the frame of the machine whereby, as the development electrode assembly 322 is rotated about its pivots to a horizontal position, slides 360 are cammed downwardly or outwardly by cams 366. As slides 360 reach the limit of their movement, they are latched in extended position against the tension of springs 362 by means of spring-urged latches 368 that are pivotally mounted on the side of casting 345 and are resiliently urged to engage with outwardly projecting extensions 369 formed on the slides. Subsequently, these latches are released, as described below, by lugs positioned on the sides of the cover assembly as the cover assembly closes.

Also forming a part of the plate-holding mechanism are four spring-urged latches 370, each of which is mounted on a slide support 361. The mounting for each latch 370 is such that the turned over portion thereof is cammed outwardly by the outer edges of a xerographic plate as the development electrode assembly 322 is moved upwardly to engage therewith, and then latches over the plate to position it laterally with reference to development electrode 350. On each of the upper slide supports 361 there is formed a cam surface 372 that coacts with the pivotally mounted idler rolls 273 of the exposure position mechanism, as described above, and serves to cam such rolls outwardly to disengage a xerographic plate 50 held by the rolls when the development electrode assembly is moved clockwise to receive a plate from the exposure position.

In order completely to insulate a xerographic plate 50 from development electrode assembly, four nylon spacers 374 (see also FIG. 12) are arranged on opposite sides of the development electrode 350. These spacers are positioned immediately beneath the outer face of the development electrode and are effective to fit between side rails 52 of a xerographic plate 50 and the development electrode. Thus, by nylon spacers 374 and O-ring 358, the xerographic plate is completely insulated electrically from the development electrode.

For elevating the surface of a xerographic plate from the development electrode assembly at the end of a developing operation, thereby to prevent smearing of the powder image formed on the face of the plate, spring-urged nylon blocks 375 are recessed in development electrode casting 345. These blocks are urged outwardly from the face of development electrode assembly 322 by suitable springs, and are provided with suitable limit stops (not shown) whereby they are retained in position as an integral part of the assembly. The outer faces of blocks 375 engage rails 52 on each xerographic plate 50 and, when the development mechanism cover is closed, are compressed into their respective recesses in the casting. However, when the cover is released, the associated springs are effective to push the plate with a powder image thereon away from O-ring 358 so that the plate may be moved upwardly without contact between the O-ring and the powder image on the plate.

Figure 9:
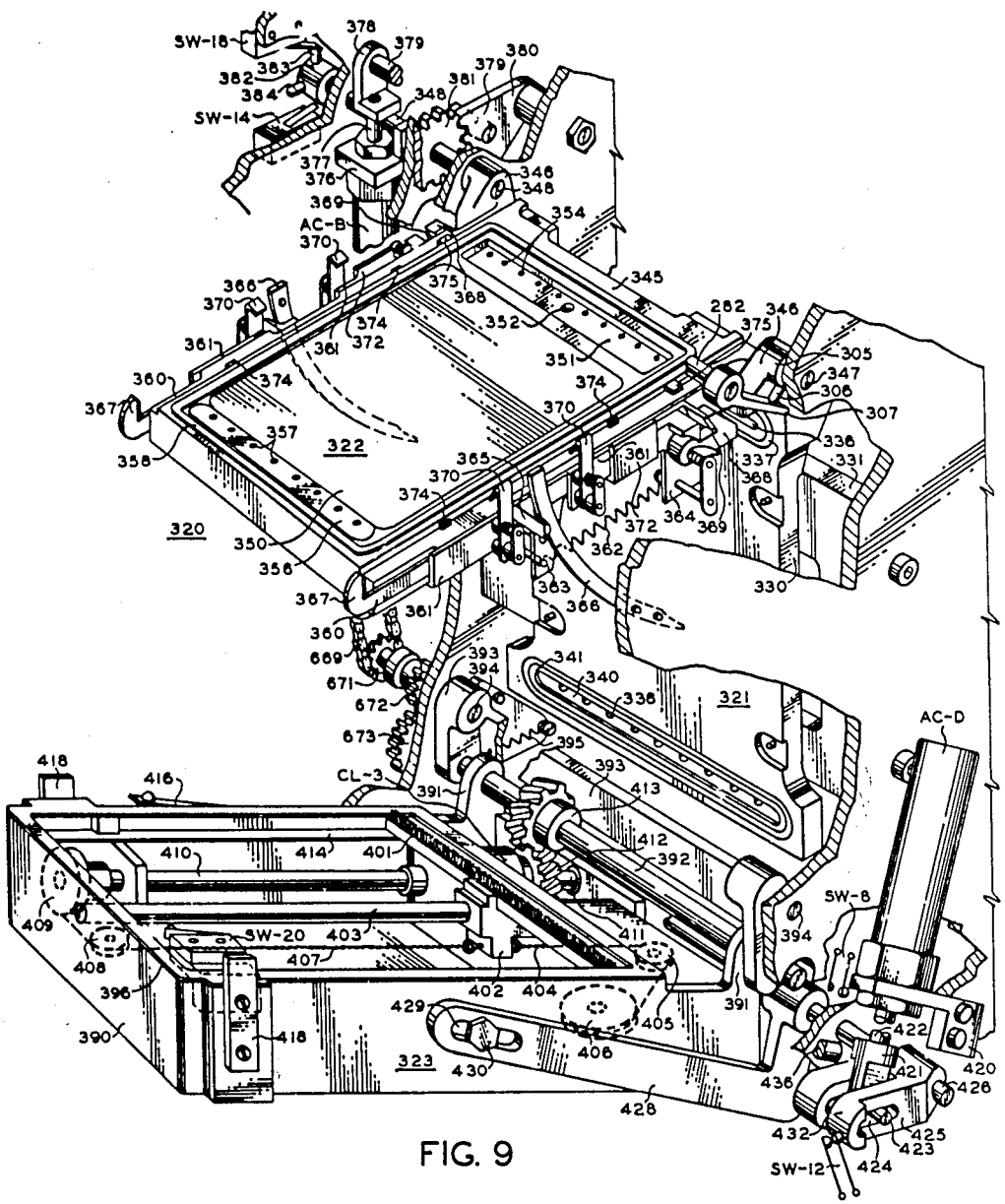
FIG. 9 is an isometric view, partly in section, of the developing mechanism of the invention, showing the several components thereof substantially in extended position to withdraw a xerographic plate from the exposure position mechanism.

The motive power for actuating development electrode assembly 322 from its plate developing position (as shown in FIG. 10) to its plate receiving position (as shown in FIG. 9) and return is obtained from an air cylinder B that is actuated under control of suitable switching means, described below, to rotate the assembly to its plate receiving position in timed relation to the operation of the exposure mechanism, and, immediately thereafter, to restore the assembly with the exposed xerographic plate thereon to its developing position. Air cylinder B is secured on a bracket 376 (FIG. 9) fixed on the frame of the machine and its piston rod 377 is provided with an offset bracket 378 that is connected by a rod 379 to a segmented gear 380 that is pivotally mounted on the side frame and meshes with a pinion 381 fixed on pivot shaft 348 of the electrode assembly. When the development electrode assembly is to be moved to its developing position, piston rod 377 of air cylinder B is extended to rock segmented gear 380 clockwise thereby rotating pinion 381 counterclockwise and moving the rearward face of the development electrode casting 345 into engagement with the several O-rings formed on the surface of base plate assembly 321. When the development assembly is to be moved to engage a xerographic plate 50 at the exposure position, the piston of air cylinder B is retracted, thereby rocking segmented gear 380 counterclockwise and rotating pinion 381 clockwise to move the development electrode assembly clockwise about its pivots 347 and 348 to a substantially horizontal position. In order to control related mechanisms, a collar 382 is fixed to an extension of shaft 348 and is provided with a first switch-actuating pin 383 to actuate a switch SW-18 when the development electrode assembly is moved to plate engaging position, and a second switch-actuating pin 384 to actuate a switch SW-14 when the assembly is moved to developing position.

The development electrode cover assembly 323 comprises a rectangular box-like casting 390 that is open on one side and is provided with outwardly projecting lugs 391 that are pivotally journalled on a shaft 392 that is supported by a transverse crank arm assembly 393 which, in turn, is pivotally mounted on studs 394 secured in the side walls of the apparatus and is resiliently urged counterclockwise by a spring 395. By this arrangement there is provided a floating pivot construction whereby, when cover 390 is rotated clockwise to its closed position, its rim makes flush contact either with the back surface of a xerographic plate 50 or with rectangular O-ring 358 set on development electrode assembly casting 345, depending upon whether or not a plate is in developing position in the developing assembly. When a plate is in developing position, cover 390 is electrically isolated therefrom by an insulating gasket 396 secured on the face of the cover rim.

In order to clean the surface of development electrode 350 of residual powder after a developing operation, the cover assembly includes a power-actuated brush mechanism that is arranged for vertical movement over the face of the development electrode. For this purpose, a brush member 401 is fixed on a crosshead 402 that is slidably mounted on a rod 403 that extends longitudinally through the center of the cover and is secured at opposite ends thereof. Brush 401 is moved by a system of power-actuated cords attached on opposite sides of crosshead 402, including a cord 404 that extends over a sheave 405 and around a spring-loaded pulley 406 that is rotatably mounted on the inner face of the cover. From the opposite side of crosshead 402 a cord 407 extends over a rotatably mounted sheave 408 and around a second pulley 409 that is fixed on a shaft 410 that is mounted for rotational movement in suitable bearing blocks and is connected through a clutch mechanism CL-3 to a driven shaft 411 that is also mounted for rotation in suitable bearings within the cover. Driven shaft 411 has fixed thereto a helical gear 412 that is driven from a similar gear 413 fixed on shaft 392, which is continuously rotated by the drive mechanism of the apparatus, as described below.

At the end of each developing operation and after the xerographic plate is removed from the developing chamber, clutch CL-3 is energized, as described below, whereby pulley 409 is rotated to draw crosshead 402 upwardly to the limit of its travel in one direction. At this point the crosshead contacts microswitch SW-20 which is effective to de-energize clutch CL-3, whereby the spring on pulley 406, which is tensioned by the movement of the crosshead, is effective through cord 404 to pull the crosshead backwardly. By this arrangement brush member 401 makes a back and forth circuit of the surface of development electrode 350 and serves to loosen any residual powder that may have adhered thereto, whereupon the loosened powder is purged from the developing chamber by high pressure air, as described below. Suitable brush guides 414 are provided on the inner faces of the sides of cover 390 to insure proper centering of brush member 401 at all times.

In order to connect plate 50 to the desired biasing potential during a developing operation, cover 390 is provided with a spring contact member 416 that makes electrical contact with the back of plate 50 when the cover is closed. Also mounted on cover 390 are two outwardly extending lugs 418 which, as the cover assembly is moved to its closed position, are effective to rock their respective spring-urged latches 368 clockwise about their pivots and thereby release slides 360 for movement under control of their springs 362, as described below.

Motive power to actuate cover assembly 323 is obtained from an air cylinder D that is fixed on a bracket 420 secured on the side frame and is provided with an adaptor 421 on the forward end of its piston rod 422 having a lateral rod 423 that extends into elongated slots 424 in each arm of a clevis 425 fixed on a shaft 426 that is suitably journalled in the side frames of the apparatus. Also fixed on shaft 426 is an offset crank 428 having an elongated slot 429 at its forward end that rides on a stud 430 fixed in the outer wall of cover 390. When cover assembly 323 is to be opened to permit the development electrode assembly to be actuated to engage a plate, air cylinder D is actuated to extend its piston rod 422 whereby shaft 426 is rocked counterclockwise which serves, through crank 428, to move the cover assembly counterclockwise to its open position. After development electrode assembly 322 is actuated to receive a plate from the exposure position mechanism and is restored to developing position, air cylinder D is retracted to rock shaft 426 clockwise and thereby rotate cover 390 to its clockwise or closed position. For actuating other mechanisms in timed relation to the operation of cover assembly 323, a switch actuating extension 432 is formed on clevis 425 that is effective to close a microswitch SW-12 when the cover is open and to close a switch SW-8 when the cover assembly is closed.

Also forming a part of the cover assembly operating mechanism is a solenoid Y that is mounted on the side frame of the machine and is provided with a spring-urged armature 435 having a forwardly extending interponent 436 that passes through an aperture 437 in bracket 420. Interponent 436 is of such length that, when solenoid Y is energized and armature 435 is retracted, it extends slightly through aperture 437 and permits unimpeded operation of air cylinder D (as in FIG. 9). However, when solenoid Y is de-energized, the spring on armature 435 extends interponent 436 into the path of movement of adaptor 421 of air cylinder D. In this position of the parts (as shown in FIG. 10) air cylinder D may be actuated to extend its piston rod 422 a slight distance to open cover assembly 390 sufficiently to permit a xerographic plate therein to be ejected. However, further movement of the cover assembly is blocked. This arrangement is utilized toward the end of a developing cycle, as described below, to permit ejection of a xerographic plate from the developing mechanism prior to purging the development chamber with high pressure air.

In operation, the development mechanism assembly functions, as follows: As soon as the exposure of a xerographic plate at the exposure position is completed, and in timed relation thereto, air cylinder D is actuated to rock cover assembly 323 counterclockwise to its open position. Upon reaching its counterclockwise limit of movement, extension 432 on clevis 425 actuates switch SW-12 which is effective to initiate the operation of air cylinder B. As air cylinder B is retracted, it is effective through segmented gear 380, pinion 381 and shaft 348 to rock development electrode assembly 322 clockwise toward a position to engage a xerographic plate at the exposure position. During the upward movement of the development electrode assembly, slides 360 thereon are extended sufficiently by cams 366 to permit hook portions 367 to clear the trailing edge of the plate, and slides 360 are locked in this position by latches 368. As development electrode assembly 322 approaches its substantially horizontal position beneath the exposure position mechanism, pin 306 on collar 305 engages lever 307 and rocks shaft 282 clockwise to reset the exposure position mechanism, as described above. This action opens switch SW-17 to release the vacuum holding the xerographic plate in the focal plane of the camera, and permits the plate to rest momentarily on the annular flanges of the drive and idler rolls supported by cradles 237 and 257. As the development electrode assembly reaches its horizontal position, cam surfaces 372 thereon cam aside roller cradles 237 and 257 of the exposure position mechanism whereby the development electrode assembly is moved into position directly beneath the xerographic plate, and latches 370 are effective to latch over the upper surface of the plate and retain it juxtaposed to the development electrode assembly. Simultaneously, switch SW-18 is closed by pin 383 to initiate a short time delay cycle at the end of which air cylinder B is extended to rock development electrode assembly 322 counterclockwise to its developing position. As the development electrode assembly is moved downwardly, the xerographic plate is held thereon by means of latches 370 and hook portions 367 on slides 360.

When the development electrode assembly is restored to its developing position in juxtaposition to base assembly 321, switch actuating pin 384 actuates switch SW-14 which is effective to cause the piston of air cylinder D to be retracted, thereby closing cover assembly 323 on plate 50. As the cover assembly approaches its closed position, each of the lugs 418 thereon is effective to slide over the top of extension 369 on its associated plate-holding slide 360 and to disengage latch 368 therefrom and to hold the latch in disengaged position. As latches 368 are disengaged, springs 362 are effective to move slides 360 slightly upwardly until extensions 369 are stopped by lugs 418 on the cover assembly. This movement of slides 360 is sufficient to position the xerographic plate in its proper relationship with respect to development electrode 350 and, as cover 390 completes its movement to its closed position, it is effective to clamp the xerographic plate tightly against the O-ring 358 on the development electrode assembly and to maintain it in clamped position throughout the developing operation.

As cover assembly 323 is closed, extension 432 on clevis 425 is effective to close switch SW-8 to energize a timing circuit which, after a short delay, initiates the operation of the powder cloud generating mechanism whereby a cloud of developing material is forced through tubing 332 and holes 352 into a developing chamber formed by xerographic plate 50, the outer surface of the development electrode 350, and rectangular O-ring 358. Simultaneously, the closure of switch SW-8 is effective to de-energize solenoid Y whereby interponent 436 is moved beneath clevis 421 of air cylinder D to prevent opening of cover assembly 323, except momentarily to remove the xerographic plate, until the developing mechanism is completely purged by high pressure air at the end of the developing operation.

During the developing portion of the developing mechanism cycle of operation, a cloud of minute particles of developing material is obtained from a powder cloud generator 440 (see FIG. 11) and is passed through the developing chamber for a predetermined time period to develop the latent electrostatic image on the xerographic plate in accordance with the charge thereon. Powder cloud generator 440 is preferably an adaptation of that disclosed in copending application S.N. 504,726, filed in the name of P. G. Andrus et al. on April 29, 1955, now Patent No. 2,815,330, wherein a supply of high pressure air is blown into a gas-tight chamber having a single outlet opening and in which a powder impregnated belt is moved progressively over the output opening, whereby a stream of powder particles are dislodged from the belt and are blown through the generator outlet. In the present application pressurized air may be obtained from the aircraft supply or a separate pump 445 and is passed through a pneumatic system master solenoid valve SV–7, a pressure regulating valve 446, a generator inlet control solenoid valve SV–10, powder cloud generator 440, a generator outlet control solenoid valve SV–1, and then via tubing 332 and passages 333 and 352 to the development chamber of the apparatus.

At the end of a predetermined time period, the timing device controlling this operation is effective to turn off the powder cloud generator drive and to close solenoid valve SV–1 to stop the flow of developing powder into the developing chamber. Immediately thereafter, a solenoid valve SV–3 is opened to permit ambient air to enter the system via tubing 335 and passages 336 and 354 and be drawn therethrough by a blower (not shown) in a dust collector mechanism 450 via outlet passages 356 and 338, and tubing 339. This action effects preliminary low pressure purge of the developing chamber to remove most of the powder cloud contained therein. After a short purging action, a further timing circuit is effective to actuate air cylinder D (also see FIG. 10) to extend its piston and tend to open cover assembly 323. However, since solenoid Y remains de-energized at this point, the movement of the air cylinder piston is blocked by interponent 436 and the opening of cover assembly 323 is limited to an amount just sufficient to disengage lugs 418 from extensions 369 on slides 360, whereby springs 362 are effective to move slides 360 upwardly to eject the xerographic plate from the development chamber. Simultaneously with the opening of cover 390, spring-urged nylon blocks 375 are effective to move the powder image surface of the xerographic plate out of contact with O-ring 358 on development electrode assembly 322 so that the powder image on the plate is not smeared as the plate is moved upwardly. Immediately above developing mechanism 320 the ejected plate is engaged by power-driven rollers 466 and 467 (see FIG. 3) whereby it is conveyed through the image transfer mechanism and into a direction changing mechanism, as described below.

During the subsequent movement of the xerographic plate, various controls are actuated thereby to effect a reclosing of cover assembly 390 and a cleaning of residual powder from the developing mechanism. To this end air cylinder D is retracted to cause crank 428 to close cover 390 on development electrode assembly 322, whereby gasket 396 on the cover forms an air-tight seal with O-ring 358 on the electrode assembly.

While the cover remains closed, solenoid valve SV–3 is closed to close the system to ambient air and solenoid valve SV–6 is opened, whereby high pressure air is fed from air supply 445 via tubing 335 and passages 336 and 354 into the developing chamber. As before, the air is vented to dust collector 450 via passages 356, 338 and tubing 339.

While high pressure air is flowing through the developing chamber, clutch CL–3 of the development electrode brush cleaning mechanism is energized to engage shaft 410 with shaft 411. By this means, shaft 410 is rotated by continuously driven shaft 392 to rotate pulley 409 to wind cable 407 thereon and thereby pull brush member 401 over the surface of development electrode 350. As crosshead 402 reaches the limit of its upward travel, it actuates microswitch SW–20 which is effective to de-energize clutch CL–3 and permit brush member 401 to be restored to its starting position by means of cable 404 and spring-powered pulley 406. This back-and-forth movement of brush member 401 is effective to loosen any residual powder that may remain on the surface of development electrode 350 and permit it to be blown to dust collector 450 by the high pressure air stream that is passing through the development chamber. Further controls are effective to close solenoid valve SV–6 to shut off the supply of high pressure air to the developing chamber, and to re-energize solenoid Y to withdraw interponent 435 from the path of movement of adaptor 421 on air cylinder D, whereby developing mechanism 320 is reconditioned to receive another xerographic plate from the exposure mechanism.

*Image Transfer and Direction Changing Mechanisms*

After leaving the development chamber assembly, the xerographic plate with the developed powder image thereon is passed by drive rolls through pressure transfer rolls whereby the powder image on the plate is transferred to an adhesive paper strip and the plate is continued in the same plane of movement to a direction changing mechanism whereby its path of travel is adjusted to return it, in due course, to the plate magazine. For this purpose, the direction changing mechanism comprises a pivotally mounted frame having idler rolls that engage and drive the plate in accordance with the direction of rotation of either of two sets of driving rolls with which the idler rolls may be engaged alternately. The idler rolls are first engaged by a drive roll that is driven in geared relationship to the pressure transfer rolls and is effective to move the plate upwardly within suitable slides in the direction changing mechanism. When the plate reaches its limit of travel, switching means are actuated to operate an air cylinder to rotate the direction changing mechanism about its pivot and engage the idler rolls with the second driving roll which is effective to reverse the direction of rotation of the idler rolls. By this means, the plate is withdrawn from the direction changing mechanism and is advanced through suitable guides to a plate cleaning mechanism.

In order to convey a xerographic plate from the developing mechanism 320 to the image transfer station, a power-driven shaft 465 (see FIGS. 3 and 13) having spaced rolls 466 thereon is mounted for rotational movement in the side frames of the machine immediately above the developing mechanism assembly. Rolls 466 cooperate with similarly spaced rolls 467 on an idler shaft 468 that is also rotatably mounted in the side walls, whereby a xerographic plate ejected from the developing mechanism is gripped along its edges and moved upwardly.

Figure 14:
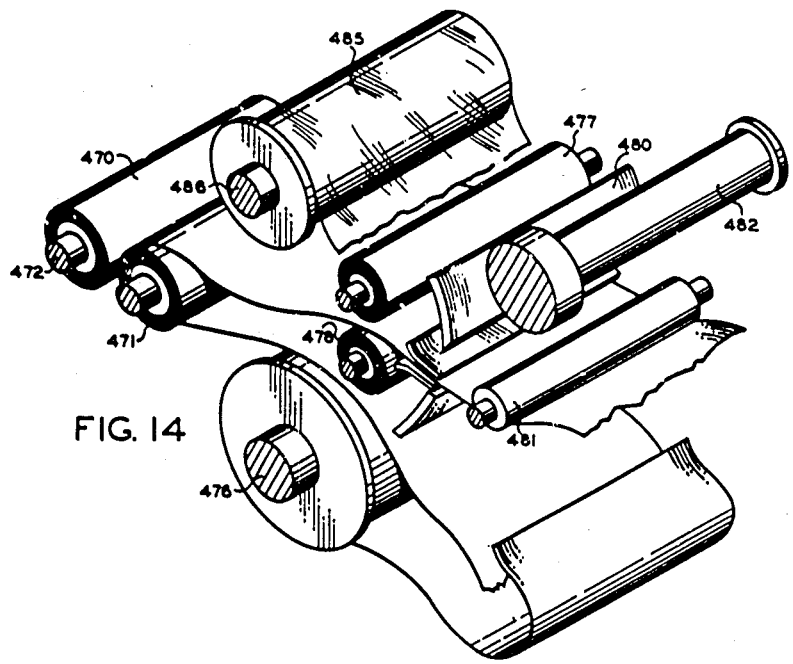
FIG. 14 is an isometric view of the xerographic powder image transfer mechanism and the image fixing mechanism.
Figure 15:
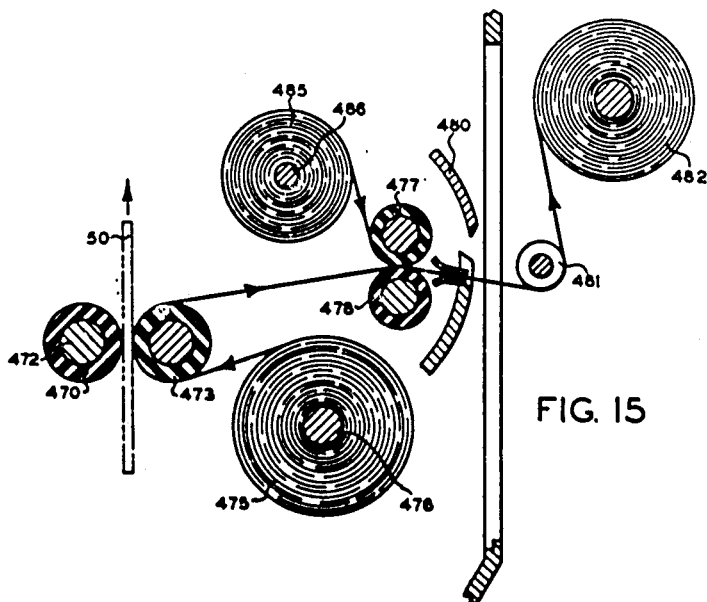
FIG. 15 is a schematic sectional view of the mechanisms of FIG. 14.

From rolls 466, the plate is moved upwardly to pass between two rubber-covered, image transfer rolls 470 and 471 each of which is rotatably mounted in the frame of the machine and, of which, roll 470 is secured on a rotatably mounted shaft 472 that is continuously rotated by the drive mechanism of the apparatus, as described below. In order to remove the xerographic powder image from the surface of the developed xerographic plate, a supply roll of adhesive-coated paper 475 (see FIGS. 14 and 15) is rotatably mounted on a spindle 476 fixed in the frame of the machine. The paper web from supply roll 475 is caused to run over the surface of roll 471 whereby it is pressed into intimate surface contact with a xerographic plate as the plate passes between the pressure rolls. This action is sufficient to cause substantially all of the xerographic powder image on the plate to adhere to the paper web which is then guided through a second pair of pressure rolls 477 and 478, a web cutter mechanism 480, around an idler roll 481, and then onto a take-up roll 482.

In order to fix the xerographic powder image on the adhesive web, a web of Pliofilm or similar transparent plastic material having a width equal at least to the image area of the paper web is arranged for superposition thereon immediately after transfer of the powder image. For this purpose, a roll of such plastic material 485 is mounted on a spindle 486 fixed in the frame of the machine and is caused to be pressed against the surface of the adhesive web by pressure rolls 477 and 478 and adheres thereto, whereby the powder image is protected against smearing and may conveniently be rolled up on take-up roll 482.

The direction changing mechanism 490 includes a U-shaped frame 491 that is positioned between the side plates of the machine and is arranged for rocking movement on a shaft 492 that is pinned to extensions 493 on the side members of frame 490 and is journalled in suitable bearings in the side plates of the machine. Fixed to a rearward extension of shaft 492 is a crank arm 493 having an elongated slot 494 that encompasses a pin 495 fixed in a clevis 496 mounted on the piston rod 497 of an air cylinder C which, in turn, is fixed on a bracket 498 secured to the frame of the machine. By this arrangement, U-shaped frame 491 is held in a substantially vertical position, as shown in FIG. 13, when piston 497 of air cylinder C is retracted, and is rocked to an inclined position when the piston is extended, as described below.

At the open end of U-shaped frame 491 there are provided spaced shafts 501 and 502 that are rotatably mounted in the frame and have rubber-covered rolls 503 at each end thereof. In the vertical position of the direction changing mechanism, rolls 503 are aligned immediately above pressure rolls 470 and 471 whereby to receive a xerographic plate fed through the pressure rolls. In this position of the parts motive power to drive rolls 503 is obtained through rubber-covered rolls 504 fixed on a shaft 505 that is journalled in the side frames and is provided with a pinion 506 that is driven through an idler gear 507 from a gear 508 fixed on shaft 472. By this arrangement, shaft 472 is driven counterclockwise and is effective to drive rolls 504 counterclockwise whereby the xerographic plate is moved upwardly as soon as it is engaged with rolls 503. Suitable guide rails 510 fixed on the interior faces of each of the side members of U-frame 491 are provided to engage the edges of the xerographic plate during its upward progress and to prevent any rocking movement thereof.

Immediately adjacent the upper ends of guide rails 510 is a second set of spaced rubber rolls 511 fixed on shafts 512 and 513 which are rotatably mounted in side members of frame 491. A ratchet wheel 515 fixed on shaft 512 is engaged by a spring-urged dog 516 rotatably pivoted on a stud 517 fixed in the U-frame whereby, while dog 516 is engaged with ratchet 515, clockwise movement may be imparted to shaft 512 to permit a xerographic plate to be moved upwardly between the rolls 511, but the dog prevents counterclockwise movement of the shaft.

In order to control the movement of direction changing frame 491, a spring biased actuating lever 520 for a microswitch SW-9 is pivotally mounted on a plate 521 fixed on the inner face of frame 491 and is provided with a rearwardly extending arm 522 that lies in the path of movement of a xerographic plate as it is moved upwardly into frame 491. When a plate in its upward movement strikes arm 522, microswitch SW-9 is actuated which, through suitable circuitry, initiates the operation of air cylinder C whereby piston rod 497 of the cylinder is extended to rock frame 491 clockwise. Rocking of frame 491 releases the contacts of a microswitch SW-10 which is mounted on a bracket 525, fixed to the side wall of the machine, and control circuits that provide safety interlocks for related mechanisms in this position of the parts. Specifically, the release of microswitch SW-10 is effective to open circuits to prevent air cylinder D of the development mechanism from operating, thereby to prevent another plate from being fed to the direction changing mechanism; and to prevent solenoid X of the plate magazine from operating, in order to prevent another operation of single revolution clutch mechanism 130.

As frame 491 is rocked clockwise, the xerographic plate fed thereto is held therein by frictional engagement with rolls 511 which are prevented from movement by ratchet 515 and dog 516. The extent of clockwise movement of frame 491 is limited by an adjustable screw 526 that is fixed in a bracket 527 secured to a side plate. Immediately before frame 491 strikes limit stop 526, a second adjustable stop 528 strikes the upper end of ratchet dog 516, thereby disengaging ratchet 515 and releasing the xerographic plate from the frictional grip exerted by rolls 511. Simultaneously, in the fully rocked position of the frame, feed rolls 503 on shaft 501 are moved to a position to engage a pair of rubber-coated rolls 529 fixed on a shaft 530 that is suitably journalled in the side plates of the machine and is provided with a sprocket 531 fixed thereto, whereby it is continuously rotated in a counter-clockwise direction by the drive mechanism of the machine, as described below. By this arrangement rolls 503 on shaft 501 are rotated clockwise whereby the xerographic plate is immediately ejected from the direction changing mechanism as soon as the frame reaches its limit of rotational movement, and is fed thereby to the plate cleaning mechanism.

*Plate Cleaning Mechanism*

The plate cleaning mechanism comprises a rotatable brush of such construction as to apply extremely light pressure to the photoconductive surface of the xerographic plate and dislodge any powder particles that may adhere thereto. This brush, in turn, is cleaned by a flicking bar that is mounted to contact the end brush bristles as they rotate to detach powder particles adhering thereto. The detached powder particles are removed from the vicinity of the brush cleaner by a suitable vacuum system. After the plate is passed over the cleaning brush it is fed to another set of drive rolls which guide it into the plate storage magazine.

Structurally, the plate cleaning mechanism 540 (FIGS. 3 and 16) includes a substantially cylindrical brush assembly 541 that is preferably formed of animal fur secured to a thick cardboard cylinder 542. Cylinder 542 is supported at its left end by a truncated cone-shaped insert 543 (see also FIG. 17) having an annular flange 544 that is substantially coextensive with cylinder 542 and is provided with a plurality of pointed pins 545 around its periphery that pierce cylinder 542 to retain the cylinder fixed relative to insert 543. Insert 543 is fixed on a shaft 546 mounted for rotation in ball bearings set in an end plate 547 that is secured to the side frame of the machine. Shaft 546 extends through the side frame and is driven directly from the drive mechanism of the machine, as described below. At its opposite end brush assembly 541 is supported on a cone-shaped insert 548 (see also FIG. 18), having a plurality of pins 549 arranged around its periphery similar to insert 543, that is fixed on a stud shaft 550 that is supported for rotational movement on an end plate 551 that forms part of a casting 552 that includes an oblong support plate 553 which, in turn, is fixed to the side frame of the machine.

For containing powder particles removed from xerographic plates by brush assembly 541, there is provided a dust cover and cap 555 that is fixed on end plate 547 and has a sheet metal cover member 556 integrally secured thereto that is formed to encompass approximately two-thirds of the brush area and is provided with turned-over lip portions 557 and 558 that are effective to support a xerographic plate passed through the plate cleaning mechanism. Lip portions 557 and 558 are so formed and spaced that the bristles of brush assembly 541 extend thereabove sufficiently to contact the surface of a xerographic plate. A second end cap 559 is fixed on the opposite end of cover member 556 and is provided with a flange member 560 for seating end plate 551. The dust cover assembly is completed by a sheet metal cover member 561 that is supported between end caps 555 and 559 and is arranged in spaced relation to lip portions 557 and 558 to provide space for a xerographic plate to pass between the lip portions and cover member 561.

For removing dust particles from the interior of the plate cleaning assembly a semi-cylindrical exhaust duct 564 is arranged to cover a slot that extends transversely across cover member 556 and is connected by tubing 566 to dust collector 450, mentioned above, whereby a vacuum may be applied to the interior of the plate cleaning mechanism to remove dust that is dislodged from a plate surface. To insure thorough cleaning of brush assembly 541 a flicking bar 567 is preferably secured to the interior of the cover member adjacent the edge of exhaust duct 564 and in interfering relation with the ends of the brush assembly bristles whereby dust particles may be dislodged therefrom.

The particular structure described above is employed to permit ready access to the interior of the plate cleaning mechanism whereby brush member 541 may readily be removed and replaced. For this purpose, oblong support plate 553 is detached from the side frame of the machine and removed from the plate cleaning assembly, together with end plate 551, merely by pulling outwardly on plate 553. This action disengages pins 545 and 549 from cylinder 542 and permits brush assembly 541 to be removed. A new brush may readily be replaced merely by inserting it into the opening in end cap 559 and over the cone-shaped portion of insert 543. The cone-shaped portion of insert 548 is then inserted into the opposite end of the brush assembly and is pressed thereagainst until end plate 551 seats firmly in the recess formed by end cap 559 and flange 560. This action forces pins 545 and 549 into cylinder 542 of the new brush assembly and thereby forms a positive driving connection whereby the brush may be rotated.

Pneumatic Control System

Each of the several air cylinders, A, B, C and D, mentioned above, constitute conventional pneumatic devices that are actuated to operate their associated mechanisms by suitable relay controlled solenoid valves whereby high pressure air from air supply 445 (see FIG. 11) is variously directed to attain the desired results. Since the control system for each air cylinder is substantially identical, a description of one such system is considered to suffice as a description for all.

Specifically, high pressure air is conducted from air supply 445 via a system controlling solenoid valve SV-7, pressure control valve 446, tubing 455 to a supply manifold 456 whence it is conducted via tubing 457 and 458 to solenoid valves SV-11 and SV-13, respectively, the inlet valves for air cylinder A. Similarly, outlet solenoid valves SV-12 and SV-14 are connected in the exhaust lines for air cylinder A for use with solenoid valves SV-11 and SV-13, respectively, and in turn, are connected via tubing 459 and 460 to an exhaust manifold 461. By suitable circuitry, inlet solenoid valve SV-13 is arranged to be opened concomitantly with outlet solenoid valve SV-14, whereby air cylinder A is actuated to extend its piston rod to operate the xerographic plate transfer mechanism of plate magazine 100 to move a xerographic plate from the magazine supply and advance it to its charging position. When air cylinder A is to be retracted to cause the plate transfer mechanism to secure another xerographic plate, solenoid valves SV-13 and SV-14 are closed and solenoid valves SV-11 and SV-12 are opened, whereby the piston of air cylinder A is retracted. Suitable flow control valves 462 and 463 are arranged in each exhaust line for air cylinder A and may be adjusted, in conventional manner, to attain the desired response time in each mode of operation of the air cylinder.

In the same manner, air cylinder B is provided with inlet solenoid valves SV-15 and SV-17 that operate in tandem with outlet solenoid valves SV-16 and SV-18, respectively, to control the operation of development electrode assembly 322; air cylinder C is actuated under control of inlet solenoid valves SV-19 and SV-21 that function in conjunction with outlet solenoid valves SV-20 and SV-22, respectively, to effect the actuation of the direction changing mechanism assembly; and air cylinder D is actuated under control of inlet solenoid valves SV-23 and SV-25 that function in conjunction with outlet solenoid valves SV-24 and SV-26, respectively, to control the movement of cover assembly 323 of the developing mechanism.

Drive Mechanism

The prime mover for actuating the various driven shafts of the several component mechanisms of the invention constitutes an electric motor 600 (see FIG. 19) which is connected via shaft 601 to a gear reduction unit 602 which contains suitable gear reducing devices for actuating shaft 546 of the plate cleaning mechanism at relatively high speed, and for actuating a shaft 603 at relatively lower speed whereby the remaining mechanisms of the system are driven. Fixed on shaft 603 is a sprocket 604 that drives a sprocket chain 605 that extends around a tensioning sprocket 606 and thence around a sprocket 607 that is fixed on shaft 472 of the image transfer mechanism which is directly driven thereby. Also fixed on shaft 472 is a sprocket 610 that meshes with a sprocket chain 611 that extends over a tensioning sprocket 612 and drives a sprocket 613 fixed on shaft 530 which, as described above, is effective to withdraw xerographic plates from the direction changing mechanism and advance them to the plate cleaning mechanism.

Also fixed on shaft 530 is a sprocket 615 that meshes with a sprocket chain 616 that extends over a tensioning sprocket 617 and then over a driven sprocket 132 that is fixed on a stud shaft 133 that is rotatably journalled in the frame of the machine. As described above, a pinion 134 is fixed on shaft 132 and drives a pinion 135 fixed on shaft 136 of the single-revolution clutch mechanism 130 located in plate magazine 100. Chain 616 is also employed to drive a sprocket 618 that is fixed on shaft 619 on which are mounted drive rolls 570 for passing a xerographic plate from the plate cleaning mechanism into plate magazine 100, and is then returned over tensioning sprocket 620 to sprocket 615.

For driving crosshead 209 of the plate charging mechanism, a spur gear 622 is also fixed on shaft 619 and is effective to drive a pinion 623 that is mounted on a stud shaft 624 that is suitably journalled in the frame of the machine and serves to drive a sprocket 625 through a clutch CL–4. Sprocket 625 engages a chain 626 that drives a sprocket 627 which is effective to rotate a shaft 628 that is provided with a bevel gear 629 that drives a bevel gear 630 fixed on a short shaft 631 on which is mounted pinion 215 of the plate charging drive mechanism, described above. Shaft 628 is also provided with a clutch CL–5 that functions to impart a braking action to the shaft when clutch CL–4 is de-energized. Bevel gear 629 is also effective to rotate a bevel gear 633 that is fixed on a shaft 634 that extends into a housing 635 for actuating the conventional "shutter wind" and "cock and trip" mechanisms that are conventionally employed in the K–17 aerial camera. These are the conventional mechanisms employed with this device and, therefore, do not require further description herein except to note that a shutter wind shaft 637 and a shutter cock and trip shaft 638 extends from housing 635 to lens and shutter assembly 40 to effect their usual function. A manual control for effecting the same functions is also provided via shaft 639, pinion 640, gear 641 and handle 642.

For driving pressure rolls 477 and 478 of the image fixing mechanism, and spindle 12 of the take-up roll mechanism, a sprocket 645 is fixed on shaft 472 and is effective to drive a chain 646 which passes over a tensionig sprocket 647 to drive a sprocket 648 fixed on a rotatable stud shaft 649. Also fixed on stud shaft 649 is a gear 650 that meshes with a pinion 651 that is connected by a clutch CL–2 to shaft 479 on which image fixing roll 478 is mounted. At its opposite end shaft 479 is provided with an extension 655 which is effective to drive a shaft 656 through a slip clutch 652. A sprocket 657 is connected on shaft 656 and drives a chain 658 which, in turn, drives a sprocket 659 fixed on spindle 12 of the paper take-up mechanism.

For rotating drive rolls 246 and 261 of the exposure position mechanism, a pinion 661 is fixed on shaft 472 and meshes with a pinion 665 that is fixed on shaft 255 of the exposure position mechanism. As explained above, rotation of shaft 255 is effective to drive rolls 246 and 261 via their respective drive shafts 238 and 258.

For actuating the brush cleaner mechanism of the developing mechanism assembly, sprocket 668 is also fixed on shaft 255 and drives a chain 669 that extends over a tensioning sprocket 670 and drives a sprocket 671 that is rotatably mounted on a stud 394 of the developing mechanism assembly. Sprocket 671 is fixed to a gear 672 that meshes with a pinion 673 that is fixed on shaft 392 of cover assembly mechanism 323. As explained above, shaft 392 is effective through helical gears 413 and 412 and clutch CL-3 to actuate brush member 401 of the plate cleaning mechanism.

The developing material powder cloud generator 440, referred to above, is driven from a pinion 662 fixed on shaft 472 that meshes with a spur gear 663 that is fixed on a shaft 664. The latter shaft is connected through a clutch CL-1 to a shaft 675 which, in turn, is connected by a bayonet coupling to the drive shaft of the generator.

Powder Cloud Generator

In order to provide a cloud of powder particles for developing the latent electrostatic image on a xerographic plate, the invention includes a powder cloud generator that is preferably an adaptation of that disclosed in above-cited copending application, S.N. 504,726, wherein a supply of high pressure air is blown into a gas-tight chamber having a single outlet opening and in which a powder impregnated belt is moved progressively over an aperture connected with the outlet, whereby a stream of powder particles are dislodged from the belt and are blown through the generator outlet.

Specifically, the powder cloud generator 440 (see FIG. 25) is housed in an oval-shaped, trough-like casting 676 having suitable bracket members 677 whereby the housing is secured to the framework of the apparatus. A cover plate 678 is secured to the open face of housing 676 and an O-ring gasket is provided therebetween whereby the housing and cover comprise a substantially gas-tight chamber. An inlet opening 679 is provided in the side of housing 676 whereby high pressure air from the aircraft supply system is directed to the interior of the housing under control of solenoid valve SV-10, as described above. An outlet connection 680 is also provided in the housing wall and is connected to the developing mechanism by suitable tubing, whereby the supply of powder particles may be directed to the developing mechanism under control of solenoid valve SV-1, as described above.

The powder cloud generating mechanism is mounted on a base plate 681 (see FIG. 24) that is suitably supported within housing 676 and includes a rotatably mounted shaft 682, provided with a frictional drag mechanism, on which is secured a supply spool 683 that is provided with a powder impregnated web 684 having a path of travel indicated by dot-dash lines in the drawing. Web 684 passes over an outlet slot 685 in the anvil of an outlet assembly 686 (see also FIG. 26), then around a capstan assembly that includes rubber covered drive rolls 687 that are fixed on a drive shaft 688 that is rotatably mounted in base plate 681, and then onto a take-up spool 689 that is secured on a shaft 690.

In order to advance web 684 over exit slot 685, capstan shaft 688 extends through base plate 681 and a spaced support plate 691 and projects through a gas-tight opening in housing 676, whereby it may be driven by shaft 675 of the drive mechanism, as described above. Web 684 is pressed against capstan rolls 687 by a roll member 692 that is supported in a pivotally mounted bracket 693 that is urged counterclockwise by a strong spring 694 so that a substantially positive drive is imparted to the web. Take-up spool 689 is driven by means of a pinion 695 that is fixed on capstan shaft 688 and meshes with a pinion 696 that is connected to take-up spool shaft 690 through a spring-loaded friction disc mechanism 697. By this arrangement, take-up spool 689 maintains substantially uniform tension on web 684 as the web diameter changes on the take-up spool without tending to pull the web relative to driving rolls 687.

With the arrangement thus far disclosed, when a cloud of powder particles is to be supplied to the developing mechanism, high pressure air is admitting to housing 676 and, simultaneously, clutch CL-1 of the drive mechanism (see also FIG. 19) is energized to rotate capstan shaft 688 whereby web 684 is pulled over outlet slot 685. As the web passes the slot, the powder particles therein are blown through the slot by the high air pressure within the housing and are forced through a stainless steel tube 698 within outlet assembly 686 and are then conducted via outlet 680 to the developing mechanism, as required.

In order to facilitate changing of powder particle webs 684, bracket 693 is provided with a notched extension that may be engaged by a latch member 699 that is pivotally mounted on outlet assembly 686. By this means, bracket 693 may be moved to a clockwise position and latched therein to permit a new web 684 to be threaded over capstan rolls 687.

System Operation

In the light of the foregoing description of the several component parts of the xerographic processing system of the invention, the operation thereof may best be understood by reference to the wiring diagram of FIGS. 22 and 23. To condition the system for automatic operation, the operator is required to establish a number of conditions and circuits manually, in accordance with the type of operation desired and the operating conditions that are expected to be met, by manipulation of the several controls illustrated in FIG. 2, as follows:

(1) Heater switch SW-1 connects a heater 701 that is controlled by a thermostat 702 to maintain the temperature of the equipment at a predetermined degree.

(2) Power supply switch SW-2 energizes the high voltage power supply filament circuit and is used to select the altitude range at which the equipment is expected to operate.

(3) Exposure switch SW-3 sets the camera for taking a single exposure and is connected in parallel with a single exposure switch on intervalometer 30.

(4) Charging current switch SW-4 is a double-pole double-throw switch which in its "test" position, enables a meter to be connected into the plate charging circuit to measure the plate current; and, in its "operate" position, as in FIG. 23, applies ground potential to the xerographic plate.

(5) Line purging switch SW-5 is provided to permit periodic purging of the tubing connections between the powder cloud generator and the developing chamber, in accordance with operating conditions.

(6) Paper feeding switch SW-6 is employed to effect feeding of the paper under control of the operator to permit the last developed xerograph to be advanced out of the camera, if required.

(7) Development cycle time selector switch SW-7 is provided to permit the operator to determine the developing time period within the range from 1 to 4 seconds. For most conditions, a 3 second setting is suitable.

(8) Plate bias is established by means of a variable resistor 705 whereby the bias potential on the plate 50 may be adjusted in the range from 0 to −50 volts. This bias is required to compensate for residual potential on the plate and is normally adjusted to produce clear, white areas on the image, usually at about −10 volts, as indicated on the associated meter 706.

(9) Air pressure regulator 446 (FIG. 11) is adjusted to provide a constant air pressure of 60 p.s.i.

(10) Shutter controls 15 and 16 (FIG. 3) are adjusted to set the shutter speed and diaphragm opening, as required, in accordance with anticipated operating conditions.

After the several controls are properly conditioned by the operator, the system is in condition for automatic operation. This is initiated by depressing a starting button on intervalometer 30 that is effective to energize the power circuits of all the electrical elements in the camera, and initiates the operation of timer 2 which maintains these circuits energized after an exposure signal in order to permit the complete processing of an exposed plate. It de-energizes the circuits after a period of 3 minutes if another signal is not received. This serves the dual purpose of running the drive motor steadily during a sequence of pictures and preventing the motor from idling for long periods of time when no pictures are being made. Timer T-2 is reset by each exposure signal.

The exposure signal also energizes locking solenoids SOL-V and SOL-Y which prevent the plate carriage in the magazine and the development electrode cover from moving freely when the camera is not in use. In addition, the exposure signal operates air supply solenoid valves SV-7 and SV-10 initiates the operation of drive motor 600 and the blower motor in dust collector 450; operates solenoid valve SV-5 to the aircraft vacuum supply line; and operates solenoid valves SV-3 and SV-8 to permit ambient air to enter the developing and exposure zones, respectively. It also energizes clutch CL-5 to lock the charging scorotron in position. In this condition of the apparatus, air cylinders A, C and D are held retracted, and air cylinder B is extended.

After initiation of a cycle of operation under control of intervalometer 30, the interrelation of the circuitry of FIGS. 22 and 23 and the several mechanisms of the invention, described above, is apparent by reference to the timing diagram (see FIGS. 20 and 21) which defines the time relationship of the several successive steps of operation, as follows:

*Timing circuit TC-6 (first delay).*—Approximately ½ second after the initiation of the cycle by the intervalometer, relay R-10 is energized. Resistor 708 and capacitor 709 constitute an R-C combination which provides the delay. Relay R-10 operates relay R-11 which energizes solenoid valves SV-13 and SV-14, and de-energizes solenoid valves SV-11 and SV-12 to extend air cylinder A and release a plate from the magazine. Relay R-10 through an R-C combination (resistor 711 and capacitor 712) starts the second delay of timing circuit TC-6. (Relay R-9.)

*Switch SW-13 (actuated).*—Switch SW-13 is actuated by air cylinder A in its extended position. Relay R-3 is energized by switch SW-13. Relay R-8 is energized through contact 714 of relay R-3 and contact 715 of switch SW-15 to de-energize clutch CL-5 and energize clutch CL-4 which starts the plate and scorotron in motion and winds the shutter.

*Timing circuit TC-6 (second delay).*—Relay R-9 is energized approximately ½ second after relay R-10 is operated. This completes a circuit to solenoid SOL-X through relays R-8, R-9, R-16, and R-17. The R-C combination (resistor 717 and capacitor 718) used with relay R-17 allows solenoid SOL-X to be operated with a pulse of short duration. Upon closure of the contacts of relay R-9, voltage is applied to solenoid SOL-X through the normally closed contacts of relay R-17. However, a short time afterward relay R-17 is energized and the voltage is removed. Solenoid SOL-X trips single revolution clutch 130 to meter out a new plate to the plate holding pawls.

*Switch SW-16 (released).*—As the scorotron moves away from its initial position, switch SW-16 is released. Relay R-3 holds through normally closed contacts of switch SW-16. Relay R-3 now provides a holding circuit for relay R-2 so that relay R-7 which initially provided the holding circuit can now operate without affecting the action of relay R-2.

*Switch SW-17 (actuated).*—When the plate reaches the exposure position (focal plane) switch SW-17 is actuated. Switch SW-17 opens the holding circuit of relay R-5 to de-energize the relay. This completes the circuit to relay R-7 so that the shutter and timing circuit TC-4 can operate when relay R-7 is energized at a later time. Switch SW-17 also operates relay R-13 and relay R-26. Relay R-26 energizes solenoid valve SV-4, de-energizes solenoid valve SV-8 and de-energizes relay R-40 to turn off the high voltage power supply. Solenoid valve SV-4 turns on the vacuum necessary to hold the plate in the exposure position. Relay R-13 de-energizes relay R-10 by discharging capacitor 709 through resistor 708. A holding circuit is also provided by relay R-3 for relay R-13. Relay R-10 de-energizes relay R-11 which energizes solenoid valves SV-11 and SV-12 and de-energizes solenoid valves SV-13 and SV-14 to retract air cylinder A. Relay R-9 is also de-energized by relay R-10 but some time after the contacts of relay R-10 have opened. This time is determined by the discharge time of capacitor 712 through relay R-9. Relay R-17 is released after relay R-9 is de-energized at a time determined by the discharge of capacitor 718 through relay R-17.

*Switch SW-13 (released).*—Retraction of air cylinder A releases switch SW-13. This has no effect on the components since relay R-3 which was originally operated by this switch is now holding through switch SW-16.

*Timer T-1.*—Three seconds after the intervalometer pulse, timer T-1 operates and energizes relay R-7 through contact 720 of relay R-5. Relay R-7 starts timing circuit TC-10 (relay R-32). The normally closed contacts of relay R-32 energize solenoid SOL-W with a short pulse in the same manner that relay R-17 pulses solenoid SOL-X. Solenoid SOL-W trips the camera shutter.

*Switch SW-15 (actuated).*—Switch SW-15 is actuated by the scorotron at the end of its travel to energize relay R-42 and de-energize relay R-8. Relay R-42 starts timing circuit TC-4 (relay R-14). Relay R-8 de-energizes clutch CL-4 and energizes clutch CL-5 bringing the scorotron to a stop.

*Timing circuit TC-4.*—One-half second after the operation of timer T-1, relay R-14 is energized. Relay R-14 energizes relay R-37 through the normally closed contacts of relay R-20 and R-36 to energize solenoid valves SV-25 and SV-26 and de-energize solenoid valves SV-23 and SV-24 to extend air cylinder D. Relay R-21 is energized by relay R-14 to de-energize solenoid valve SV-3 through contact 722 and closes the vent to the development zone. Relay R-21 holds through contact 723. Relay R-30 is energized by relay R-37 but without effecting the circuit operation since contact 725 of relay R-29 is disconnected from the line at that time. Relay R-30 holds through switch SW-20.

*Switch SW-8 (released).*—As air cylinder D moves to the extended position opening the development electrode cover switch SW-8 is released. This has no effect on the operation of the camera at this time since no voltage is applied to terminal 727 of switch SW-8.

*Switch SW-12 (actuated).*—Air cylinder D in the extended position actuates switch SW-12. The common terminal of switch SW-12 (terminal 729) is at a potential of 24 volts D.C with respect to ground by the operation of relay R–14 (timing circuit TC–4 above) so that switch SW–12 operates relay R–27 through the closed contact 731 of relay R–20. Relay R–27 energizes solenoid valves SV–17 and SV–18 and de-energizes solenoid valves SV–15 and SV–16 to retract air cylinder B.

*Switch SW–14 (released)*.—Air cylinder B pivots the development electrode to pick up the plate from the focal plane. As air cylinder B moves to extended position switch SW–14 is released. This short circuits contact 732 of relay R–20 which has no effect since this contact is already closed.

*Switch SW–18 (actuated)*.—As the development electrode approaches the plate, switch SW–18 is actuated to start timing circuit TC–8 (relay R–39).

*Switch SW–17 (released)*.—At approximately the same time switch SW–18 is operated and before timing circuit TC–8 starts, the development electrode resets the exposure mechanism to release switch SW–17. This de-energizes relay R–26 to energize solenoid valve SV–8, and de-energizes solenoid valve SV–4 to turn off the vacuum holding the plate in the exposure position. Relay R–26 also energizes relay R–40 to turn on the high voltage power supply.

*Timing circuit TC–8 (relay R–39)*.—Closure of relay R–39 completes the circuit to relay R–20. Relay R–20 releases relay R–27 through contact 731. Relay R–27 energizes solenoid valves SV–15 and SV–16 and de-energizes solenoid valves SV–17 and SV–18 to extend air cylinder B returning the development electrode to its initial position. Relay R–20 holds through contact 733. Air cylinder D is unaffected by this operation of relay R–20 since contact 732 is shorted by switch SW–14.

*Switch SW–18 (released)*.—As the development electrode swings back with the plate, switch SW–18 is released. Relay R–39 is released by this action but relay R–20, which has a holding contact, is unaffected. Release of relay R–39 has no effect on camera operation.

*Switch SW–14 (actuated)*.—Switch SW–14 is actuated by the development electrode at the completion of its downward travel. This removes the short circuit across contact 732 of relay R–20 to release relay R–37. Solenoid valves SV–23 and SV–24 are energized and SV–25 and SV–26 are de-energized to retract air cylinder D to close the development electrode cover.

*Switch SW–12 (released)*.—As the development electrode cover swings up, switch SW–12 is released. However, switch SW–12 is in series with contact 731 of relay R–20 which is already opened. Therefore, releasing switch SW–12 has no effect on the operation of the circuit at this time.

*Switch SW–8 (actuated)*.—As the development electrode cover returns to the closed position, switch SW–8 is again actuated. At this time, terminal 727 of switch SW–8 is at 24 volts D.C. with respect to ground, since previous operation of relay R–20 accomplished this. Relays R–4, R–8, and R–12 are actuated by switch SW–8. Relay R–4 energizes timer T–3 (development cycle timer) through the contacts of relay R–1. Relay R–4 also operates clutch CL–1 and relay R–44 through the normally closed contact 735 of relay R–25. Relay R–44 operates solenoid valve SV–1. Solenoid valve SV–1 starts flow of the developing powder and clutch CL–1 starts the powder cloud generator. Relay R–4 also de-energizes solenoid SOL–Y which limits the opening of the development electrode cover later during plate ejection. Relay R–8 energizes clutch CL–4 and de-energizes clutch CL–5 to start the scorotron back to its original position. Relay R–12 serves to release relay R–18 at the completion of timing circuit TC–7. Operation of the relay at this point makes it possible for timing circuit TC–7 to start by removing R–11 from the circuit.

*Switch SW–15 (released)*.—As the scorotron starts back to its original position, switch SW–15 is released. This has no effect on the operation of the circuit at this time since relay R–42, which was originally operated by switch SW–15, remains energized via contact 737. Completion of the circuit through contact 715 of switch SW–15 merely shorts contacts 739 of relay R–4 which are now closed.

*Switch SW–16 (actuated)*.—Switch SW–16 is actuated by the scorotron returning to its original position. This removes the holding circuit from relay R–3 through contact 741. Relay R–3 is released by this action to release clutch CL–4 and operate clutch CL–5 to stop the travel of the scorotron. Relay R–3 also opens the holding circuit of relays R–2 and R–13 through contact 742. Relay R–2 returns timer T–1 to its zero position, to release relay R–7. Relay R–2 opens the holding circuit of relay R–42 which releases relay R–14 a short time later. Relay R–7 releases relay R–32 (timing circuit TC–10). This has no effect on the sequence of operations since voltage is removed from contact 744 of relay R–32 by the release of relay R–7. Release of relay R–13 has no effect since contact 734 of relay R–20 is opened at this point.

*Timer T–3 (1–4 second delay)*.—At an interval of 1, 2, 3 or 4 seconds, depending on position of the development time selector switch (SW–7), timer T–3 energizes relay R–25 and starts timing circuit TC–7 (relay R–19). Relay R–25 releases clutch CL–1 to turn off the powder cloud generator drive and also de-energizes relay R–44 to close solenoid valve SV–1 and stop flow of developing powder.

*Timing circuit TC–7 (first delay)*.—Relay R–19 is energized 1/10 second after the operation of timer T–3 to start the second time delay of timing circuit TC–7 (relay R–18) and energize relay R–24. Relay R–24 energizes solenoid valve SV–3 through the normally closed contacts 746 of relay R–23. Solenoid valve SV–3 allows ambient clean air to enter the development zone.

*Timing circuit TC–7 (second delay)*.—Relay R–18 operates ¼ second after the closing of the contacts of relay R–19. Relay R–18 energizes relay R–23 to operate relay R–37 through closed contacts of relays R–15 and R–36. Solenoid valves SV–23 and SV–24 are de-energized and solenoid valves SV–25 and SV–26 energized to operate air cylinder D. Solenoid valve SV–3 is de-energized by relay R–23 and clutch CL–2 is energized by this same relay through the closed contacts of relays R–15, R–16 and R–24. The development electrode cover is opened by the action of air cylinder D. Since solenoid SOL–Y is de-energized at this point, the opening is limited to an amount sufficient for the plate to be ejected from the development chamber. Solenoid valve SV–3 shuts off the flow of clean air and clutch CL–2 starts the paper feed roller drive.

*Switch SW–9 (actuated)*.—Opening of the development electrode cover releases the ejector arms pushing the plate into the transfer rolls. The plate continues to travel on into the transfer pivot assembly where it operates switch SW–9. Switch SW–9 energizes relay R–15 and starts timing circuit TC–5 (relay R–33). Relay R–15 de-energizes relay R–37 which in turn de-energizes solenoid valves SV–25 and SV–26 and energizes solenoid valves SV–23 and SV–24 to retract air cylinder D and close the development electrode cover. Relay R–15 also energizes solenoid valves SV–21 and SV–22 and de-energizes solenoid valves SV–19 and SV–20 to extend air cylinder C and rotate the direction changing mechanism from transfer to brush cleaning position. The opening of contact 748 (relay R–15) de-energizes clutch CL–2 to stop the paper feed roller drive. Switch SW–9 also operates clutch CL–3 through the normally closed contact 725 of relay R–29 and closed contact 750 of relay R–30.

*Switch SW–10 (released)*.—Switch SW–10 is released when air cylinder C operates the direction changing mechanism. Releasing switch SW–10 operates relay R–36 through the closed contacts of relay R–25. The circuit of relay R–37 is opened by relay R–36 to prevent air cylinder D from operating. Relay R–16 is released by switch SW-10 so that solenoid SOL-X cannot operate at this time.

*Switch SW-20 (operated).*—Switch SW-20 is operated by the development electrode cleaning brush at the end of its cycle. Switch SW-20 de-energizes relay R-30 which de-energizes clutch CL-3 allowing the development electrode cleaning brush to return to its starting position.

*Timing circuit TC-5 (first delay).*—Timing circuit TC-5 starts with closure of contacts of relay R-33 after the operation of switch SW-9. Relay R-33 operates solenoid valve SV-6 and relay R-43 through closed contact 752 of relay R-36. Solenoid valve SV-6 allows pressurized clean air to enter the development chamber for cleaning purposes. Relay R-43 with resistor 754, capacitor 755, and solenoid valve SV-1 make up a pulsing circuit for pulsing solenoid valve SV-1. Relay R-33 also starts timing circuit TC-5 (second delay) and energizes relay R-29.

*Switch SW-9 (released).*—As the direction changing mechanism rotates, the plate drive rolls are engaged to remove the plate therefrom. Switch SW-9 is released without effecting the circuit since contact 757 of relay R-35 provides a holding circuit for relay R-15, and timing circuit TC-5.

*Timing circuit TC-5 (second delay).*—Relay R-34 is operated after the operation of relay R-33. Its function is merely to extend the pulsing time of solenoid valve SV-1 to provide a sufficient number of pulses by starting the third time delay step, relay R-35.

*Timing circuit TC-5 (third delay).*—Relay R-35 operates after the operation of relay R-34 to energize relay R-28 and open the holding circuit of relay R-15. Relay R-28 opens the holding circuit through contact 759 of relays R-4, R-20 and R-21. Capacitor 761, across relay R-33, is discharged to ground by relay R-28 releasing relay R-33. Relay R-33 releases relay R-29, and relay R-29 in turn releases relay R-35. Relay R-34 is released a definite time after the contacts of relay R-33 open. This time is governed by the time constants of the circuit. Relay R-4 releases relays R-12, R-18, R-23, R-25, R-36, R-43 and timer T-3. Relay R-19 is released a short time later determined by the constants of the circuit. Relay R-24 is released by relay R-19. Release of relay R-12 closes the intervalometer circuit and the manual picture switch circuit so that another cycle can start. Relay R-4 when released energizes solenoid SOL-Y. Relay R-33 when released de-energizes solenoid valve SV-6 to cut off the pressurized clean air to the development chamber. Relay R-21 energizes solenoid valve SV-3 to allow ambient clean air to enter the development chamber. Relay R-15 retracts air cylinder C by energizing solenoid valves SV-19 and SV-20 and de-energizing solenoid valves SV-21 and SV-22. This returns the direction changing mechanism to its original position.

*Switch SW-11 (actuated).*—Switch SW-11 is actuated by the plate returning to the magazine. Relay R-22 is operated by switch SW-11. Capacitor 763 holds relay R-22 energized for a short time to operate solenoid SOL-X with a pulse through the closed contacts of relay R-17. Relay R-17 then operates to open the circuit to solenoid SOL-X. Solenoid SOL-X meters out a new plate to the plate holding pawls (if not already loaded) and moves the returning plate to the holding section of the plate magazine.

*Switch SW-11 (released).*—When the plate drops into the magazine, switch SW-11 is released. This has no effect on the operation since relay R-22 remains energized until capacitor 763 discharges. Relay R-22 de-energizes at a later time with no effect on the circuit.

*Switch SW-10 (actuated).*—Switch SW-10 is actuated by the direction changing mechanism in returning to its normal position. Relay R-16 is again operated closing contact 765 in preparation for another cycle to complete the circuit to solenoid SOL-X. This completes the cycle.

If no additional cycles are started within a period of three minutes, the normally closed contacts of timer T-2 are opened at the end of this time, releasing the holding circuit of relay R-6. Relay R-6 opens contact 767, to disconnect the 24 volt D.C. supply from all circuits, and opens relay R-1 to disconnect the 110 volt A.C. supply. Relay R-38 holds closed until heater switch is turned off.

*Switch SW-2 (operated manually).*—Relay R-40 and relay R-41 are de-energized by manually operating switch SW-2 to secure the system.

This application is a division of our copending application Serial No. 663,085, filed June 3, 1957, now Patent No. 3,009,402.

Since many changes could be made in the above construction and many apparently widely different embodiments of this invention could be made without departing from the scope thereof, it is intended that all matter contained in the drawings shall be interpreted as illustrative and not in a limiting sense.

What is claimed is:

1. An apparatus for developing electrostatic latent images on xerographic plates including a base plate assembly having inlet and outlet connections for xerographic developing material, a development electrode assembly including a development electrode and having inlet and outlet connections for developing material that are aligned with the corresponding connections of the base plate assembly, means on said development electrode assembly for securing a xerographic plate thereon in operative relation to the development electrode, means for moving the development electrode assembly into and out of operative relation with the base plate assembly, means operable when the development electrode assembly is out of operative relation with the base plate assembly for positioning a xerographic plate on the development electrode assembly, and means operable when the development electrode assembly is in operative relation with the base plate assembly for maintaining said operative relation for a predetermined time period.

2. An apparatus for developing electrostatic latent images on xerographic plates including a base plate assembly having inlet and outlet connections for xerographic developing material, a development electrode assembly including a development electrode and having inlet and outlet connections for developing material that are aligned with the corresponding connections of the base plate assembly, means on said development electrode assembly for securing a xerographic plate thereon in operative relation to the development electrode, means for moving the development electrode assembly into and out of operative relation with the base plate assembly, means operable when the development electrode assembly is out of operative relation with the base plate assembly for positioning a xerographic plate on the development electrode assembly, and a cover assembly operable when the development electrode assembly is in operative relation with the base plate assembly for enclosing the development electrode assembly and maintaining it in operative relation with the base plate assembly for a predetermined time period.

3. An apparatus for developing electrostatic latent images on xerographic plates including a base plate assembly having inlet and outlet connections for xerographic developing material, a development electrode assembly including a development electrode and having inlet and outlet connections for developing material that are aligned with the corresponding connections of the base plate assembly, means on said development electrode assembly for securing a xerographic plate thereon in operative relation to the development electrode, means for moving the development electrode assembly into and out of operative relation with the base plate assembly, means operable when the development electrode assembly is out of operative relation with the base plate assembly for positioning a xerographic plate on the development electrode assembly, a cover assembly operable when the development electrode assembly is in operative relation with the base plate assembly for enclosing the development electrode assembly and maintaining it in operative relation with the base plate assembly for a predetermined time period, and means for controlling the flow of developing material through said inlet and outlet connections during said time period.

4. An apparatus for developing electrostatic latent images on xerographic plates including a base plate assembly having inlet and outlet connections for xerographic developing material, a development electrode assembly including a development electrode and having inlet and outlet connections for developing material that are aligned with the corresponding connections of the base plate assembly, means on said development electrode assembly for securing a xerographic plate thereon in operative relation to the development electrode, means for moving the development electrode assembly into and out of operative relation with the base plate assembly, means operable when the development electrode assembly is out of operative relation with the base plate assembly for positioning a xerographic plate on the development electrode assembly, a cover assembly operable when the development electrode assembly is in operative relation with the base plate assembly for enclosing the development electrode assembly and maintaining it in operative relation with the base plate assembly for a predetermined time period, means for controlling the flow of developing material through said inlet and outlet connections during said time period, and means for removing excess developing material from said apparatus at the end of a developing cycle.

References Cited in the file of this patent

UNITED STATES PATENTS

| | | |
|---|---|---|
| 2,831,409 | Bixby et al. | Apr. 22, 1958 |
| 2,877,132 | Matthews | Mar. 10, 1959 |